United States Patent
Durham et al.

(10) Patent No.: US 10,054,105 B2
(45) Date of Patent: Aug. 21, 2018

(54) DOLPHIN-BLADE, FLUID FLOW, RECIPROCAL MOTOR

(75) Inventors: Gary L. Durham, Stuart, FL (US); H. Stephen Durham, Palm City, FL (US)

(73) Assignee: Just the 4 of Us, LLC, Wichita, KS (US)

( * ) Notice: Subject to any disclaimer, the term of this patent is extended or adjusted under 35 U.S.C. 154(b) by 629 days.

(21) Appl. No.: 13/460,793

(22) Filed: Apr. 30, 2012

(65) Prior Publication Data

US 2013/0287573 A1    Oct. 31, 2013

(51) Int. Cl.
    *F03B 17/06*    (2006.01)

(52) U.S. Cl.
    CPC .......... *F03B 17/06* (2013.01); *F05B 2210/16* (2013.01); *F05B 2250/11* (2013.01); *Y02E 10/28* (2013.01)

(58) Field of Classification Search
    CPC ............... F03B 13/1805; F03B 13/181; F03B 13/1815; F03B 13/1845; F03B 13/1855; F03B 17/06; F03B 17/067; F03D 5/06
    USPC .............................................. 416/34, 83, 79
    See application file for complete search history.

(56) References Cited

U.S. PATENT DOCUMENTS

| | | | | |
|---|---|---|---|---|
| 419,321 A | * | 1/1890 | Courtright | F25B 9/145 416/83 |
| 1,093,696 A | * | 4/1914 | Guenther | F04D 33/00 417/436 |
| 4,319,454 A | * | 3/1982 | Lucia | F03B 13/1815 417/332 |
| 4,435,131 A | * | 3/1984 | Ruben | F04D 33/00 417/334 |
| 4,915,584 A | * | 4/1990 | Kashubara | F03D 5/06 416/64 |
| 5,302,092 A | * | 4/1994 | Tsutahara | F04D 33/00 417/436 |

FOREIGN PATENT DOCUMENTS

| | | | | |
|---|---|---|---|---|
| DE | | 2446964 A1 * | 4/1976 | ............. F04D 33/00 |
| WO | WO 2008144938 A1 * | 12/2008 | | |
| WO | WO 2011115475 A2 * | 9/2011 | | |

* cited by examiner

*Primary Examiner* — Richard Edgar
(74) *Attorney, Agent, or Firm* — Patrick E. Caldwell, Esq.; The Caldwell Firm, LLC

(57) ABSTRACT

A system for capturing fluid energy has a blade shaft coupled to a gear assembly and a blade assembly. The blade assembly has a rod arm and a blade having a front surface and a blade plane, the blade fixedly coupled substantially normal to the rod arm. A limiter coupling has a limiter coupling axis and is coupled to the blade such that the limiter coupling axis is substantially parallel to the front surface and perpendicular to the rod arm. A horizontal limiter restricts the limiter coupling to a range of motion substantially along a first movement axis perpendicular to the limiter coupling axis and substantially perpendicular to the blade shaft. The blade assembly interacts with a fluid flow to transmit fluid energy from the fluid flow to the blade shaft to impart rotational energy to the gear assembly.

19 Claims, 13 Drawing Sheets

DOLPHIN-BLADE, FLUID FLOW, RECIPROCAL MOTOR

TECHNICAL FIELD

The present invention relates generally to the field of mechanical energy transformation and, in particular, to a Dolphin-Blade, Fluid Flow, Reciprocal Motor.

BACKGROUND OF THE INVENTION

Modern fluid energy capture systems commonly operate as either horizontal or vertical windmill designs. Generally, typical systems succeed in converting some portion of fluid energy to mechanical energy, which is then typically converted to electrical energy. Typical systems, however, often suffer from significant drawbacks. For example, common horizontal windmills often require a large, open area with consistently high wind flow, including placing the wind interaction area high above the ground. Some vertical windmill designs allow placement of the power generation unit on the ground instead of many meters in the air, which removes the cross-section of the power generation unit from the wind interaction area. However, many common vertical windmill designs are unable to produce a wing design that interacts with the wind as efficiently as the propeller and wind-screw designs of common horizontal windmills.

Similar challenges arise in common water-based fluid energy capture systems (e.g., "water wheels"). For example, many common water wheel systems seek to capture the fluid energy inherent in natural moving water, such as streams and rivers. However, typical systems sometimes require alteration of the local environment in order to improve water flow to the point where fluid energy capture becomes practical. As such, typical water wheel systems require a dam, levee, or other significant structural modifications, which can result in significant impact on the local ecosystem.

Similarly, typical water wheel systems, even systems not requiring significant environmental restructuring, can still threaten the fish and wildlife in the ecosystem in which the typical systems operate. Some systems attempt to modify the water wheel designs in order to minimize harm to the local ecosystem. However, typical systems that aim to minimize harm to the local ecosystem frequently sacrifice production capacity to such an extent that these systems cannot provide commercial-size power production.

Moreover, some typical prior art water wheel systems, even systems not consciously designed to protect the local ecosystem, cannot scale to power production levels because their design does not operate efficiently on a large scale. While some small-design systems can provide limited power, typical systems often suffer from very large cost-to-power-output inefficiencies. Additionally, some small systems suffer from practical scaling challenges with regard to the local operating environment.

BRIEF SUMMARY

The following summary is provided to facilitate an understanding of some of the innovative features unique to the embodiments disclosed and is not intended to be a full description. A full appreciation of the various aspects of the embodiments can be gained by taking into consideration the entire specification, claims, drawings, and abstract as a whole.

In a general aspect of the invention, a system for capturing fluid energy includes a gear assembly having a gear assembly axis, the gear assembly being able to couple to a drive shaft so as to impart rotational energy from the coupling module to the drive shaft; a first blade shaft coupled to the gear assembly; a first blade assembly coupled to the first blade shaft, the first blade assembly comprising: a first rod arm able to couple to the first blade shaft; a first blade having a first front surface and a first blade plane, the first blade being fixedly coupled to the first rod arm such that the first rod arm is substantially normal to the first blade plane; a first limiter coupling having a first limiter coupling axis, the first limiter coupling being coupled to the first blade such that the first limiter coupling axis is substantially parallel to the first front surface and the first limiter coupling axis is substantially perpendicular to the first rod arm; and a first horizontal limiter coupled to the first limiter coupling such that the first limiter coupling is restricted to a range of motion substantially along a first movement axis; the first movement axis being substantially perpendicular to the first limiter coupling axis, and the first movement axis being substantially perpendicular to the first blade shaft; and the first blade assembly being able to interact with a fluid flow and to transmit fluid energy from the fluid flow to the first blade shaft so as to impart rotational energy to the gear assembly by rotating the gear assembly about the gear assembly axis.

In one embodiment, the gear assembly is a single crank wheel. In one embodiment, the first blade assembly further comprises: a second blade having a second front surface and a second blade plane, the second blade being fixedly coupled to the first blade such that the rod arm is substantially normal to the second blade plane and the second blade plane is substantially parallel to the first blade plane. In one embodiment, the first blade assembly further comprises: a second blade having a second front surface and a second blade plane, the second blade being fixedly coupled to the first blade such that the rod arm is substantially normal to the second blade plane and the second blade plane is substantially parallel to the first blade plane; and a second limiter coupling having a second limiter coupling axis, the second limiter coupling being coupled to the second blade such that the second limiter coupling axis is substantially parallel to the second front surface and the second limiter coupling axis is substantially perpendicular to the rod arm; wherein the second limiter coupling couples to the horizontal limiter.

In one embodiment, the system further comprises a second blade assembly coupled to the first blade shaft, the second blade assembly comprising: a second rod arm able to couple to the first blade shaft; a second blade having a second front surface and a second blade plane, the second blade being fixedly coupled to the second rod arm such that the second rod arm is substantially normal to the second blade plane; a second limiter coupling having a second limiter coupling axis, the second limiter coupling being coupled to the second blade such that the second limiter coupling axis is substantially parallel to the second front surface and the second limiter coupling axis is substantially perpendicular to the second rod arm; and a second horizontal limiter coupled to the second limiter coupling such that the second limiter coupling is restricted to a range of motion substantially second a first movement axis; the second movement axis being substantially perpendicular to the second limiter coupling axis, and the second movement axis being substantially perpendicular to the first blade shaft; the second blade assembly being able to interact with the fluid flow and to transmit fluid energy from the fluid flow to the first blade shaft so as to impart rotational energy to the gear assembly by rotating the gear assembly about the gear assembly axis; and wherein the second movement axis is substantially parallel to the first movement axis.

In one embodiment, the first blade assembly and the second blade assembly operate in synchronous motion. In one embodiment, the first blade assembly and the second blade assembly operate in asynchronous motion configured to maximize rotational energy imparted to the gear assembly.

In one embodiment, the system further comprises a second blade shaft coupled to the gear assembly; a second blade assembly coupled to the second blade shaft, the second blade assembly comprising: a second rod arm able to couple to the second blade shaft; a second blade having a second front surface and a second blade plane, the second blade being fixedly coupled to the second rod arm such that the second rod arm is substantially normal to the second blade plane; a second limiter coupling having a second limiter coupling axis, the second limiter coupling being coupled to the second blade such that the second limiter coupling axis is substantially parallel to the second front surface and the second limiter coupling axis is substantially perpendicular to the second rod arm; and a second horizontal limiter coupled to the second limiter coupling such that the second limiter coupling is restricted to a range of motion substantially second a first movement axis; the second movement axis being substantially perpendicular to the second limiter coupling axis, and the second movement axis being substantially perpendicular to the second blade shaft; the second blade assembly being able to interact with the fluid flow and to transmit fluid energy from the fluid flow to the first blade shaft so as to impart rotational energy to the gear assembly by rotating the gear assembly about the gear assembly axis.

In one embodiment, the gear assembly further comprises a first crank wheel, a second crank wheel, and a main drive gear; the first crank wheel couples to the first blade shaft and the main drive gear; and the second crank wheel couples to the second blade shaft and the main drive gear. In one embodiment, the first blade shaft is a compound shaft.

In another general aspect of the invention, a method for capturing fluid energy includes disposing a dolphin mill within a liquid flow, the liquid flow having a flow direction; wherein the dolphin mill comprises: a drive shaft; a gear assembly having a gear assembly axis, the gear assembly being able to couple to the drive shaft so as to impart rotational energy from the coupling module to the drive shaft; a first blade shaft coupled to the gear assembly; a first blade assembly coupled to the first blade shaft, the first blade assembly comprising: a first rod arm able to couple to the first blade shaft; a first blade having a first front surface and a first blade plane, the first blade being fixedly coupled to the first rod arm such that the first rod arm is substantially normal to the first blade plane; a first limiter coupling having a first limiter coupling axis, the first limiter coupling being coupled to the first blade such that the first limiter coupling axis is substantially parallel to the first front surface and the first limiter coupling axis is substantially perpendicular to the first rod arm; and a first horizontal limiter coupled to the first limiter coupling such that the first limiter coupling is restricted to a range of motion substantially along a first movement axis; the first movement axis being substantially perpendicular to the first limiter coupling axis, and the first movement axis being substantially perpendicular to the first blade shaft; and the first blade assembly being able to interact with the liquid flow and to transmit fluid energy from the liquid flow to the first blade shaft so as to impart rotational energy to the gear assembly by rotating the gear assembly about the gear assembly axis; and capturing the rotational energy of the drive shaft.

In one embodiment, the first blade assembly further comprises: a second blade having a second front surface and a second blade plane, the second blade being fixedly coupled to the first blade such that the rod arm is substantially normal to the second blade plane and the second blade plane is substantially parallel to the first blade plane.

In one embodiment, the dolphin mill comprises: a second blade assembly coupled to the first blade shaft, the second blade assembly comprising: a second rod arm able to couple to the first blade shaft; a second blade having a second front surface and a second blade plane, the second blade being fixedly coupled to the second rod arm such that the second rod arm is substantially normal to the second blade plane; a second limiter coupling having a second limiter coupling axis, the second limiter coupling being coupled to the second blade such that the second limiter coupling axis is substantially parallel to the second front surface and the second limiter coupling axis is substantially perpendicular to the second rod arm; and a second horizontal limiter coupled to the second limiter coupling such that the second limiter coupling is restricted to a range of motion substantially second a first movement axis; the second movement axis being substantially perpendicular to the second limiter coupling axis, and the second movement axis being substantially perpendicular to the first blade shaft; the second blade assembly being able to interact with the liquid flow and to transmit fluid energy from the liquid flow to the first blade shaft so as to impart rotational energy to the gear assembly by rotating the gear assembly about the gear assembly axis; and wherein the second movement axis is substantially parallel to the first movement axis.

In one embodiment, the first blade assembly and the second blade assembly operate in asynchronous motion configured to maximize rotational energy imparted to the gear assembly. In one embodiment, the dolphin mill further comprises: a second blade shaft coupled to the gear assembly; a second blade assembly coupled to the second blade shaft, the second blade assembly comprising: a second rod arm able to couple to the second blade shaft; a second blade having a second front surface and a second blade plane, the second blade being fixedly coupled to the second rod arm such that the second rod arm is substantially normal to the second blade plane; a second limiter coupling having a second limiter coupling axis, the second limiter coupling being coupled to the second blade such that the second limiter coupling axis is substantially parallel to the second front surface and the second limiter coupling axis is substantially perpendicular to the second rod arm; and a second horizontal limiter coupled to the second limiter coupling such that the second limiter coupling is restricted to a range of motion substantially second a first movement axis; the second movement axis being substantially perpendicular to the second limiter coupling axis, and the second movement axis being substantially perpendicular to the second blade shaft; the second blade assembly being able to interact with the fluid flow and to transmit fluid energy from the fluid flow to the first blade shaft so as to impart rotational energy to the gear assembly by rotating the gear assembly about the gear assembly axis.

In another general aspect of the invention, a system for generating electrical energy includes a drive shaft configured to rotate about a main axis in response to applied torque, thereby generating rotational energy; a dolphin mill coupled to the drive shaft, the dolphin mill configured to apply torque to the drive shaft; the dolphin mill comprising:

a coupling module configured to couple to the drive shaft; a gear assembly having a gear assembly axis, the gear assembly being able to couple to the drive shaft so as to impart rotational energy from the coupling module to the drive shaft; a first blade shaft coupled to the gear assembly; a first blade assembly coupled to the first blade shaft, the first blade assembly comprising: a first rod arm able to couple to the first blade shaft; a first blade having a first front surface and a first blade plane, the first blade being fixedly coupled to the first rod arm such that the first rod arm is substantially normal to the first blade plane; a first limiter coupling having a first limiter coupling axis, the first limiter coupling being coupled to the first blade such that the first limiter coupling axis is substantially parallel to the first front surface and the first limiter coupling axis is substantially perpendicular to the first rod arm; and a first horizontal limiter coupled to the first limiter coupling such that the first limiter coupling is restricted to a range of motion substantially along a first movement axis; the first movement axis being substantially perpendicular to the first limiter coupling axis, and the first movement axis being substantially perpendicular to the first blade shaft; and the first blade assembly being able to interact with the liquid flow and to transmit fluid energy from the liquid flow to the first blade shaft so as to impart rotational energy to the gear assembly by rotating the gear assembly about the gear assembly axis; and a generator coupled to the first drive shaft segment; and the generator configured to convert rotational energy of the drive shaft into electrical energy.

In one embodiment, the first blade assembly further comprises: a second blade having a second front surface and a second blade plane, the second blade being fixedly coupled to the first blade such that the rod arm is substantially normal to the second blade plane and the second blade plane is substantially parallel to the first blade plane.

In one embodiment, the dolphin mill comprises: a second blade assembly coupled to the first blade shaft, the second blade assembly comprising: a second rod arm able to couple to the first blade shaft; a second blade having a second front surface and a second blade plane, the second blade being fixedly coupled to the second rod arm such that the second rod arm is substantially normal to the second blade plane; a second limiter coupling having a second limiter coupling axis, the second limiter coupling being coupled to the second blade such that the second limiter coupling axis is substantially parallel to the second front surface and the second limiter coupling axis is substantially perpendicular to the second rod arm; and a second horizontal limiter coupled to the second limiter coupling such that the second limiter coupling is restricted to a range of motion substantially second a first movement axis; the second movement axis being substantially perpendicular to the second limiter coupling axis, and the second movement axis being substantially perpendicular to the first blade shaft; the second blade assembly being able to interact with the liquid flow and to transmit fluid energy from the liquid flow to the first blade shaft so as to impart rotational energy to the gear assembly by rotating the gear assembly about the gear assembly axis; and wherein the second movement axis is substantially parallel to the first movement axis.

In one embodiment, the first blade assembly and the second blade assembly operate in asynchronous motion configured to maximize rotational energy imparted to the gear assembly. In one embodiment, the dolphin mill further comprises: a second blade shaft coupled to the gear assembly; a second blade assembly coupled to the second blade shaft, the second blade assembly comprising: a second rod arm able to couple to the second blade shaft; a second blade having a second front surface and a second blade plane, the second blade being fixedly coupled to the second rod arm such that the second rod arm is substantially normal to the second blade plane; a second limiter coupling having a second limiter coupling axis, the second limiter coupling being coupled to the second blade such that the second limiter coupling axis is substantially parallel to the second front surface and the second limiter coupling axis is substantially perpendicular to the second rod arm; and a second horizontal limiter coupled to the second limiter coupling such that the second limiter coupling is restricted to a range of motion substantially second a first movement axis; the second movement axis being substantially perpendicular to the second limiter coupling axis, and the second movement axis being substantially perpendicular to the second blade shaft; the second blade assembly being able to interact with the fluid flow and to transmit fluid energy from the fluid flow to the first blade shaft so as to impart rotational energy to the gear assembly by rotating the gear assembly about the gear assembly axis.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
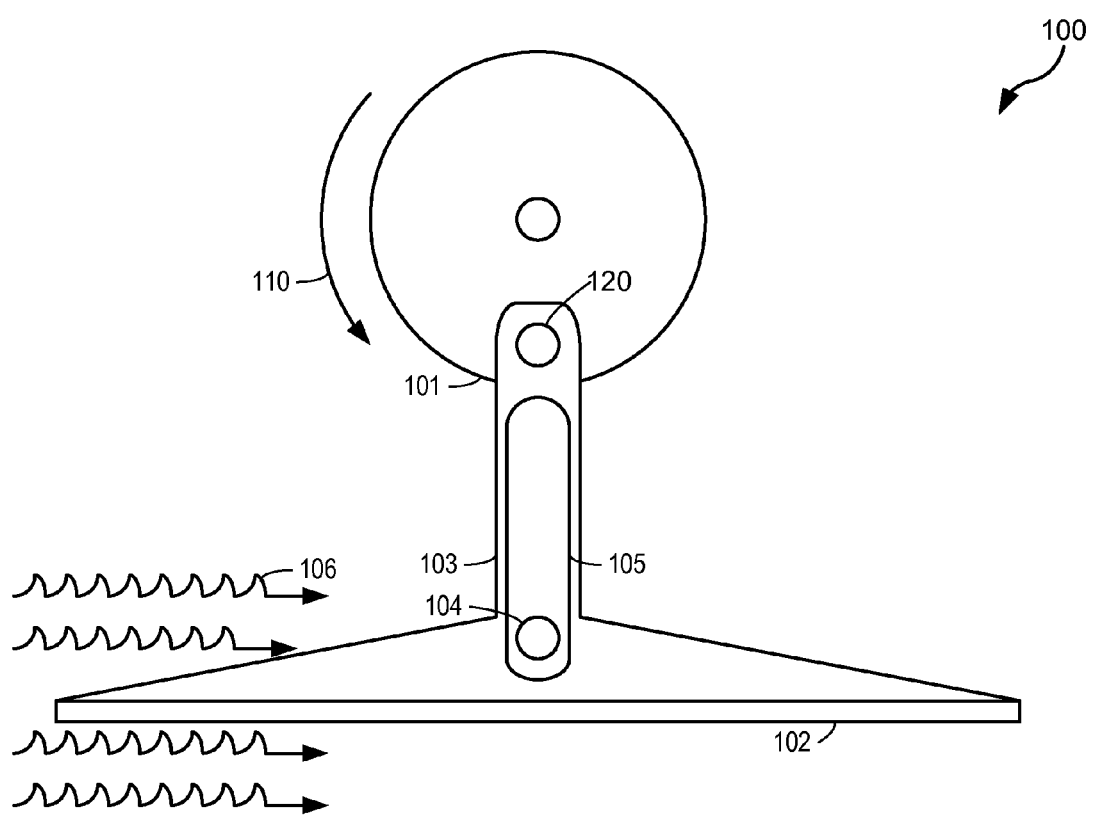
FIGS. 1-5 are high-level block diagrams showing a fluid energy capture system, which can be implemented in accordance with a preferred embodiment.

The particular values and configurations discussed in these non-limiting examples can be varied and are cited merely to illustrate at least one embodiment and are not intended to limit the scope of the invention. While numerous specific details are set forth to provide a thorough understanding of the present invention, those skilled in the art will appreciate that the present invention may be practiced without such specific details. In other instances, well-known elements have been illustrated in schematic or block diagram form in order not to obscure the present invention in unnecessary detail. Additionally, many modifications and variations will be apparent to one of ordinary skill in the relevant arts.

Referring now to the drawings, FIGS. 1-5 high-level block diagrams showing a fluid energy capture system 100, which can be implemented in accordance with a preferred embodiment. Generally, FIGS. 1-5 illustrate system 100 in operation through a single operational cycle, as described in more detail below. As shown, system 100 generally includes a blade and rod arm configured to interact with a fluid flow to apply torque to a gear assembly.

Generally, system 100 can be configured for operation in a variety of fluid flow environments, such as wind, hydraulic fluid, compressed air, blood flow, and water, for example. For ease of discussion, the embodiments described herein are described primarily with respect to capturing energy from water. One skilled in the art will understand that the disclosed embodiments can be converted to suitable fluid energy capture embodiments with minor modifications. In the illustrated environment, blade 102 interacts with fluid flow 106. In the illustrated embodiment, blade 102 couples to a rod arm 103. In one embodiment, rod arm 103 includes a blade bracing configured to maintain a fixed orientation between rod arm 103 and blade 102.

In the illustrated embodiment, rod arm 103 couples to blade 102 in a fixed orientation, perpendicular to the plane of blade 102. In one embodiment, blade 102 includes a flat surface along the entire length of blade 102, and rod arm 103 couples perpendicular to that flat surface. In an alternate embodiment, blade 102 does not include a flat surface along the entire length of blade 102, and rod arm 103 couples perpendicular to a plane bisecting blade 102. In an alternate embodiment, rod arm 103 couples to blade 102 in a fixed orientation, perpendicular to the fluid flow across blade 102 when blade 102 is at a maximum displacement position, as described in more detail below.

For example, FIG. 1 shows blade 102 in a level orientation, at a point in operation wherein system 100 is at the bottom of a stroke cycle. As used herein, the bottom of the system 100 stroke cycle is the "180 degree position." In the illustrated embodiment, the 180 degree position is a maximum displacement position. Additionally, in the illustrated embodiment and as described herein, the 180 degree position is a stroke transition point. In one embodiment, the stroke transition point corresponds to the point of maximum torque output.

Generally, system 100 operates to convert fluid energy to torque. In the illustrated embodiment, system 100 applies torque to a gear assembly. In the illustrated embodiment, the gear assembly is embodied as a crank 101, which is shown as a single crank wheel. In the illustrated embodiment, the torque applied to crank 101 causes crank 101 to rotate in the direction indicated by arrow 110. For ease of reference, the point at which rod arm 103 couples to crank 101 is indicated as point 120. In one embodiment, the 180 degree position corresponds to an orientation where point 120 is at 180 degrees from top dead center (or 6 on a clock face).

In one embodiment, system 100 also includes a horizontal limiting system. In the illustrated embodiment, system 100 includes a horizontal limiting system including a shaft 104 and a slot 105. In the illustrated embodiment, shaft 104 is a bushing-enclosed shaft coupled to rod arm 103 and mating with slot 105. In the illustrated embodiment, slot 105 is configured to allow shaft 104 to move vertically (i.e., substantially perpendicular to the direction of flow 106). Similarly, in the illustrated embodiment, slot 105 restricts shaft 104 from substantial horizontal movement (i.e., substantially parallel to the direction of flow 106.

As described in more detail below, in one embodiment, the horizontal limiting system causes blade 102 to change its orientation from level (i.e., substantially parallel to the direction of flow 106) to a maximum predetermined angle in relation to the direction of flow 106. In one embodiment, the maximum predetermined angle is based on the diameter of crank 101 and the length of rod arm 103.

Figure 2:
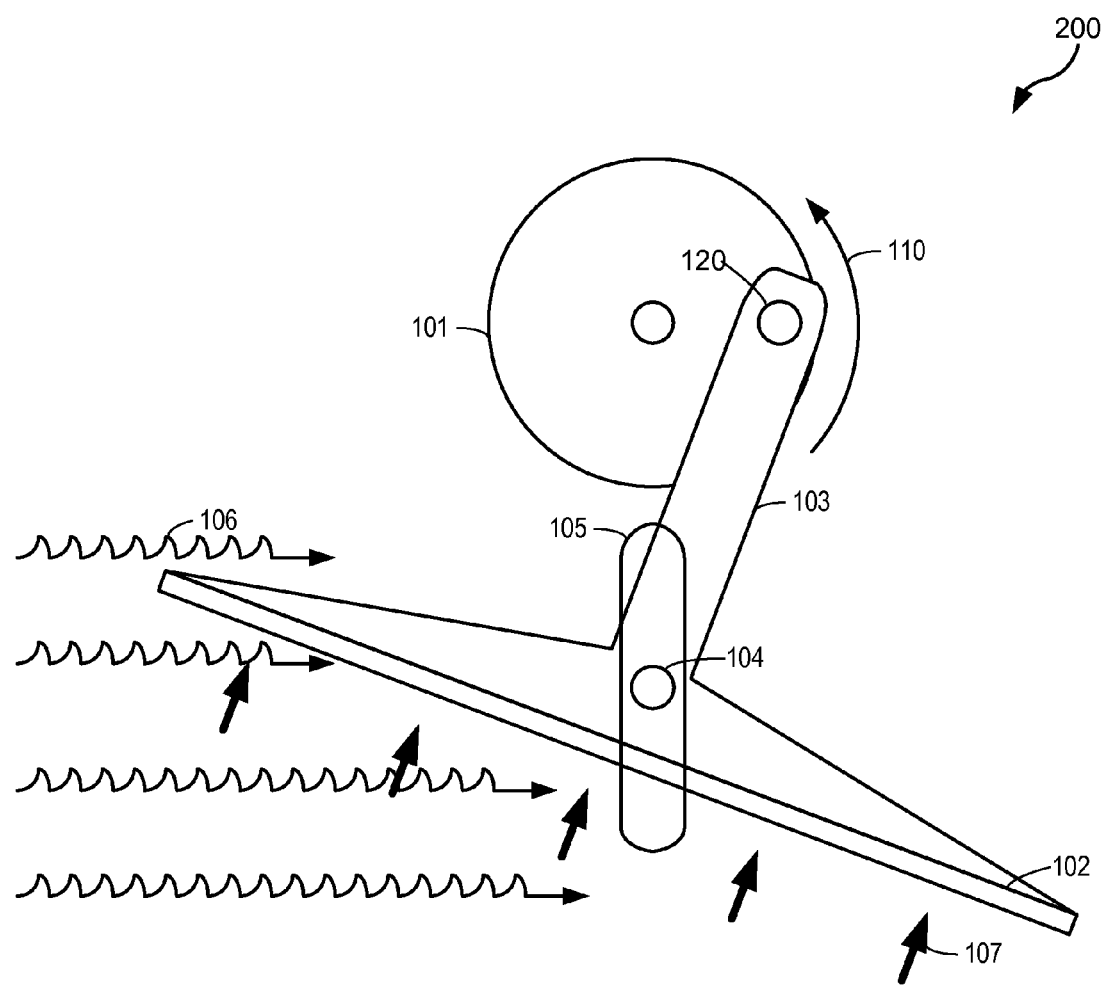

FIG. 2 illustrates an exemplary fluid capture system 200 in accordance with one embodiment. Specifically, system 200 is shown between transition points in an operational cycle. As shown, a crank 101 has moved from the 180 degree position to the 90 degree position. Generally, as used herein, the 90 degree position corresponds to a maximum angle of blade 102 with respect to the direction of flow 106. In one embodiment, the 90 degree position corresponds to an orientation where point 120 is at 90 degrees from top dead center (or 3 on a clock face). In one embodiment, the 90 degree position corresponds to a point midway between transition points in an operational cycle.

In operation, as blade 102 moves out of an orientation substantially parallel to the direction of flow 106, flow 106 exerts force on blade 102, as generally indicated by arrows 107. The force exerted by flow 106 on blade 102 causes blade 102 to move within the horizontal limiting system, causing rod arm 103 to apply torque to crank 101. As shown in the illustrated embodiment, the force exerted by flow 106 on blade 102, as restricted by the horizontal limiting system, causes shaft 104 to move vertically within slot 105, which also prevents blade 102 from substantial horizontal movement relative to crank 101. As blade 102 is limited horizontally, but not vertically, the angle of blade 102 with respect to flow 106 increases as rod arm 103 drives crank 101 from the 180 degree position to the 90 degree position.

In one embodiment, the angle between blade 102 and the direction of flow 106 reaches it maximum at the 90 degree position. Flow 106 continues to exert force on blade 102 as crank 101 passes the 90 degree position, toward the 0 ("zero") degree position. As described in more detail below, as crank 101 moves toward the 0 degree position, the angle between blade 102 and the direction of flow 106 will decrease, as blade 102 returns to an orientation substantially parallel to the direction of flow 106.

Figure 3:
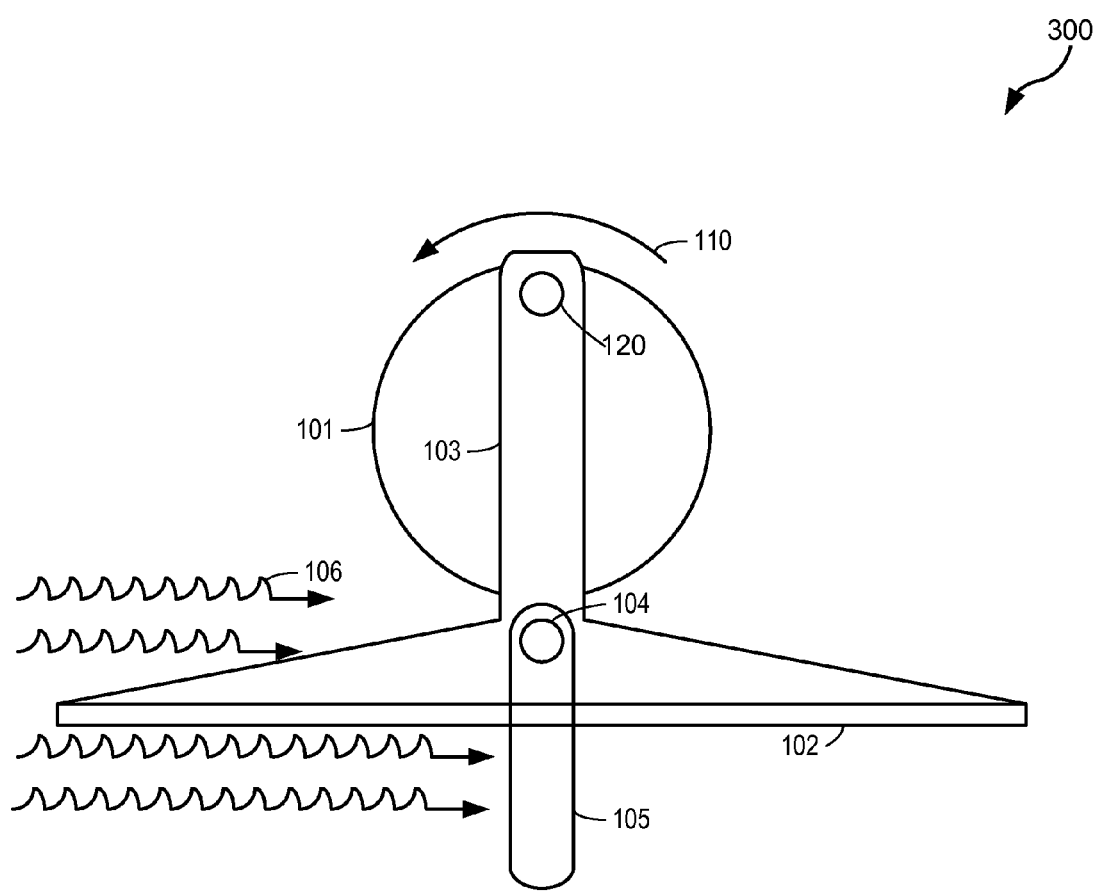

For example, FIG. 3 illustrates an exemplary fluid capture system 300 in accordance with one embodiment. Specifically, system 300 is at a transition point in an operational cycle. As shown, a crank 101 has moved from the 90 degree position to the 0 degree position. Generally, as used herein, the 0 degree position, like the 180 degree position, corresponds to a minimum angle of blade 102 with respect to the direction of flow 106. In one embodiment, the 0 degree position corresponds to an orientation where point 120 is at top dead center (or 12 on a clock face) point 120 travels around the axis of crank 101.

Generally, the transition points in the operational cycle are points of minimal torque output. As such, system 300 (and 200, for example) tend to move through the transition points of the operational cycle as powered by the momentum (or impetus) of the entire moving system. That is, the embodiments described herein work through an operational cycle, the movement of the gear assembly is driven by a changing ratio of momentum and torque applied by the fluid flow. As described in more detail below, the components of the embodiments described herein work together to optimize the torque (and therefore energy) extracted from the fluid flow.

For example, momentum generated in an earlier part of the operational cycle (e.g., the movement from FIG. 1 through FIG. 2) causes crank 101 to continue in a counter-clockwise rotation through the 0 degree position (indicated by arrow 110). As described above, the horizontal limiting system restricts the movement of blade 102 with respect to crank 101. As such, momentum causes blade 102 to begin to rotate so as to decrease the angle between blade 102 and the direction of flow 106. At the orientation shown in FIG. 3, the torque extracted from flow 106 is at a minimal point. As point 120 moves beyond the 0 degree point, torque from flow 106 begins to apply to blade 102 so as to increase the angle between blade 102 and the direction of flow 106.

Figure 4:
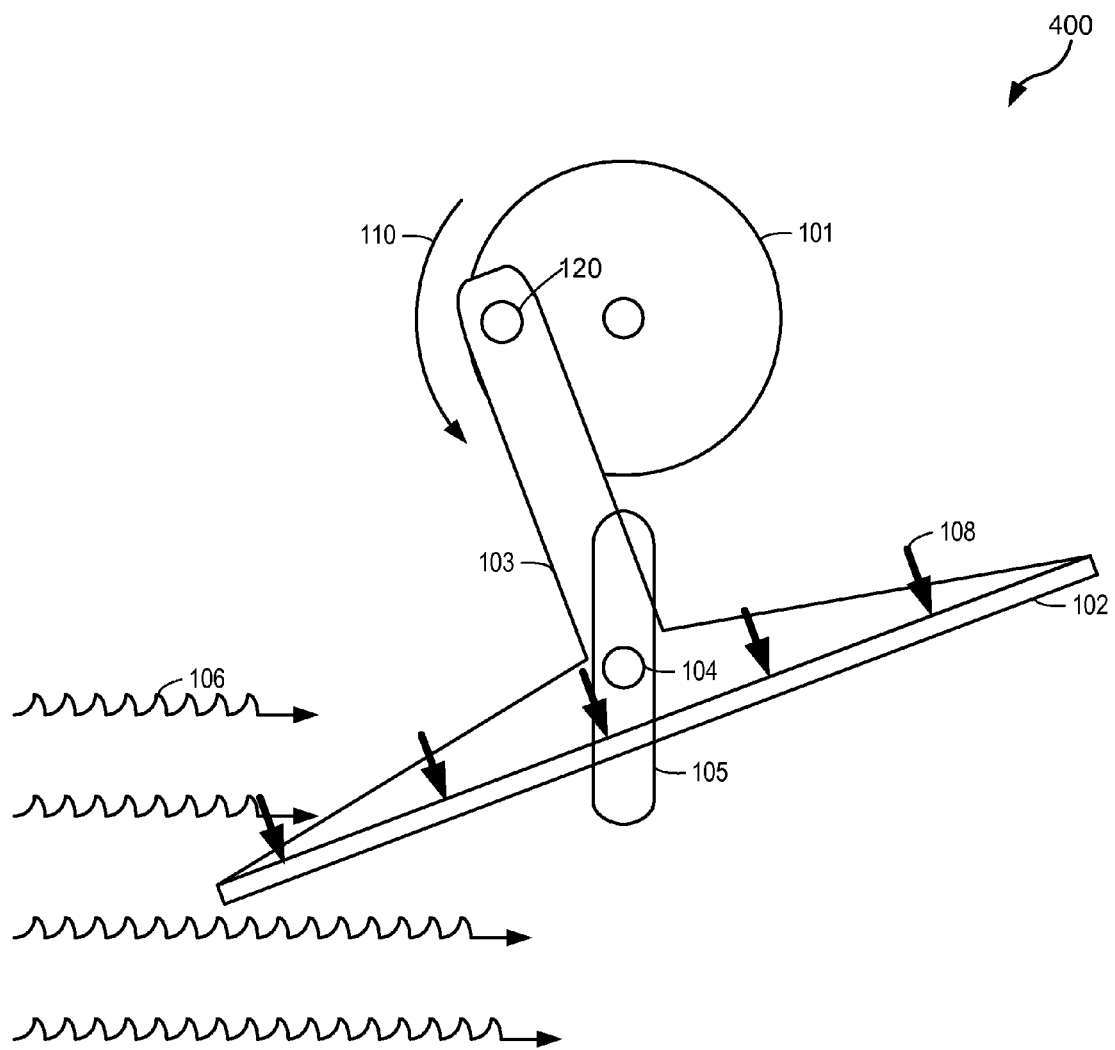

For example, FIG. 4 illustrates an exemplary fluid capture system 400 in accordance with one embodiment. Specifically, system 400 is shown between transition points in an operational cycle. As shown, a crank 101 has moved from the 0 degree position to the 270 degree position. Generally, as used herein, the 270 degree position corresponds to a maximum (downward) angle of blade 102 with respect to the direction of flow 106. In one embodiment, the 270 degree position corresponds to an orientation where point 120 is at 270 degrees from top dead center (or 9 on a clock face). In one embodiment, the 270 degree position corresponds to a point midway between transition points in an operational cycle.

In operation, as blade 102 moves out of an orientation substantially parallel to the direction of flow 106, flow 106 exerts force on blade 102, as generally indicated by arrows 108. The force exerted by flow 106 on blade 102 causes blade 102 to move within the horizontal limiting system, causing rod arm 103 to apply torque to crank 101. As shown in the illustrated embodiment, the force exerted by flow 106 on blade 102, as restricted by the horizontal limiting system, causes shaft 104 to move vertically within slot 105, which also prevents blade 102 from substantial horizontal movement relative to crank 101. As blade 102 is limited horizontally, but not vertically, the angle of blade 102 with respect to flow 106 increases as rod arm 103 drives crank 101 from the 270 degree position to the 180 degree position.

In one embodiment, the angle between blade 102 and the direction of flow 106 reaches it maximum at the 270 degree position. Flow 106 continues to exert force on blade 102 as crank 101 passes the 270 degree position, toward the 180 degree position. As described in more detail below, as crank 101 moves toward the 180 degree position, the angle between blade 102 and the direction of flow 106 will decrease, as blade 102 returns to an orientation substantially parallel to the direction of flow 106.

Figure 5:
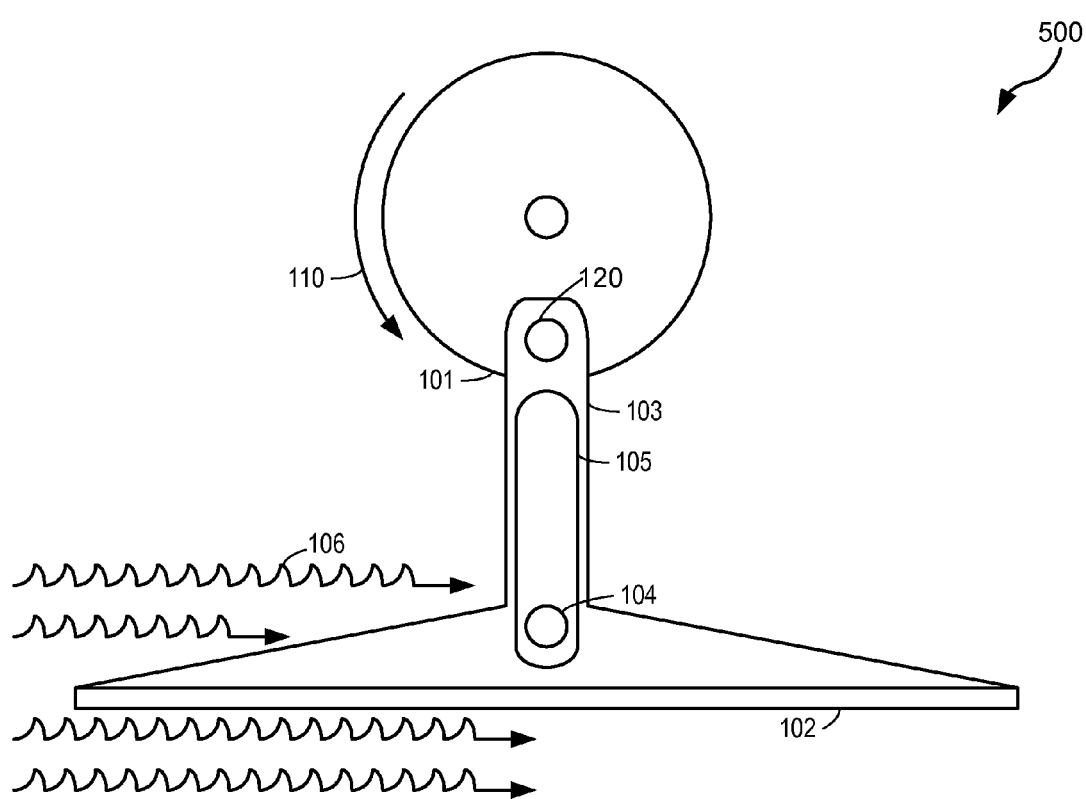

FIG. 5 illustrates a system 500 having just completed one operational cycle. As described above, a varying combination of momentum and torque extracted from flow 106 (through blade 102) causes point 120 to revolve around the axis of crank 101. As system 500 completes an operational cycle, momentum tends to push point 120 past the 180 degree point, which also improves efficiency as compared to a cycle that begins from a full stop.

Figure 6:
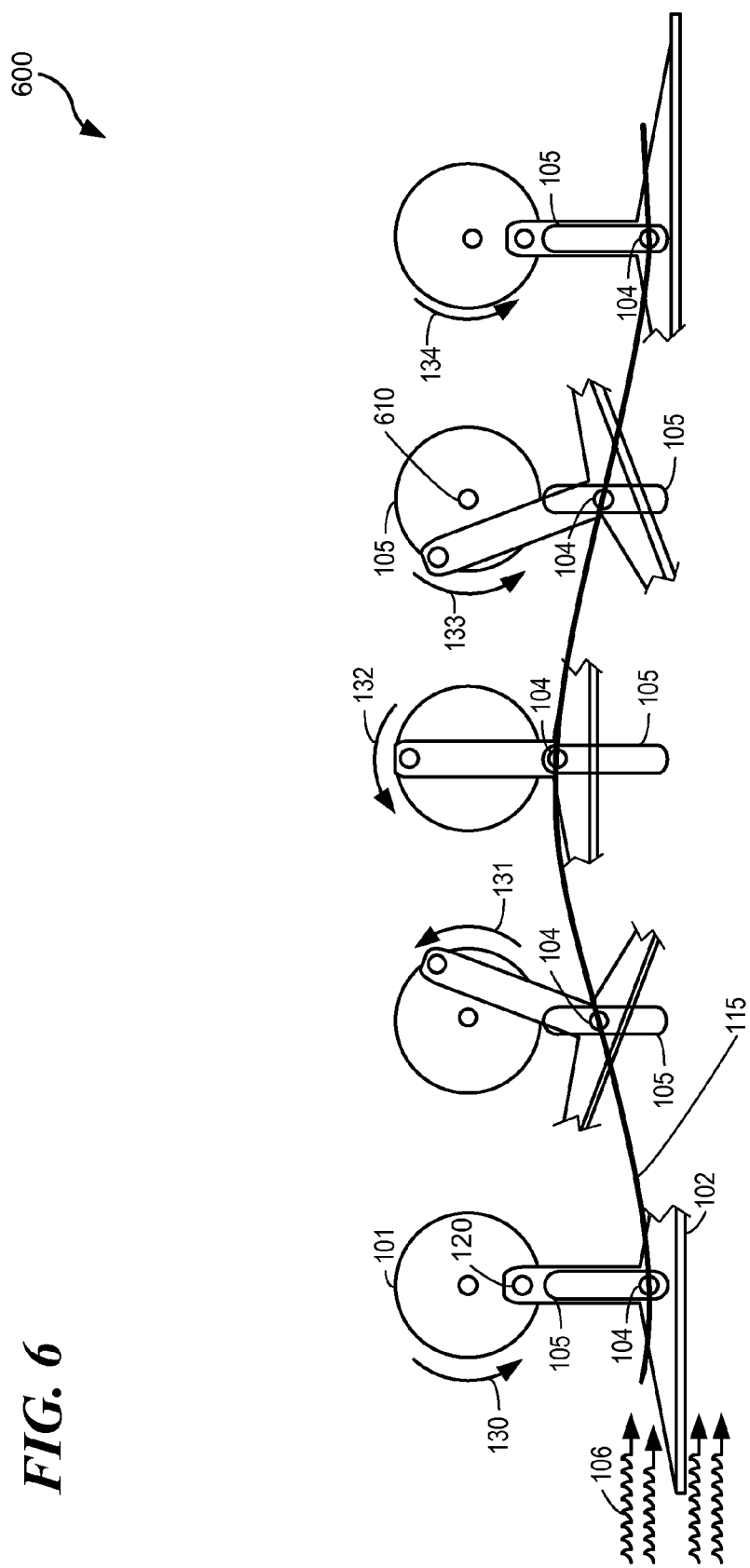
FIG. 6 is a high-level block diagram showing an exemplary fluid energy capture system as it progresses through a power cycle, which can be implemented in accordance with a preferred embodiment.

FIG. 6 presents a system 600 in various orientations in an operational cycle. One skilled in the art will recognize orientations as described above with respect to FIGS. 1-5. Arrows 130-134 indicate the direction of rotation of crank 101 as crank 101 progresses through an operational cycle. One skilled in the art will appreciate that, in the illustrated embodiment, point 120 revolves around the axis 610 of crank 101. One skilled in the art will also note that shaft 104 moves toward and away from axis 610, as limited by slot 105.

More particularly, changes in the angle of blade 102 (relative to the direction of flow 106) cause blade 102 to interact with flow 106, so as to cause torque on the crank 101 as indicated by arrows 130, 131, 132, 133, and 134. As crank 101 rotates through a complete cycle, the resulting motion of blade 102 can resemble that of the up and down swimming motion as seen in the tails of dolphins and whales. Unlike the action of a dolphin tail in the ocean, for example, the movement of blade 102 in flow 106 is not caused by a driving force originating from crank 101. Instead, flow 106 exerts force on blade 102, driving blade 102 up and down within the horizontal limiting system, thereby causing the motion of crank 101. Thus, in one embodiment, blade 102 (and the associated system components) extract rotary torque forces from flow 106 in a dolphin-tail-like motion of blade 102, harnessing the energy in the flow 106 to drive generators or other mechanical machinery.

Line 115 illustrates the trajectory of shaft 104 over time, in one embodiment. One skilled in the art will appreciate that line 115 is somewhat sinusoidal. One skilled in the art will also observe that blade 102 moves point 120 around crank 101, in response to force applied by flow 106 (and momentum), and as limited by the horizontal limiting system. As shown, the energy captured by system 600 operates in a relatively efficient manner to drive the rotary system. As such, the embodiments described herein can be configured for extraction of large torque forces from a moving current of water, as well as application of large rotary forces to any device coupled to it. Because the energy captured can be relatively very large, the disclosed embodiments can be configured to support generating stations, barges, docks, etc., in the currents of rivers and canals, at appropriate places, without the need to dam up the river or canal to generate hydro-force to drive an electrical generation system.

Figure 7:
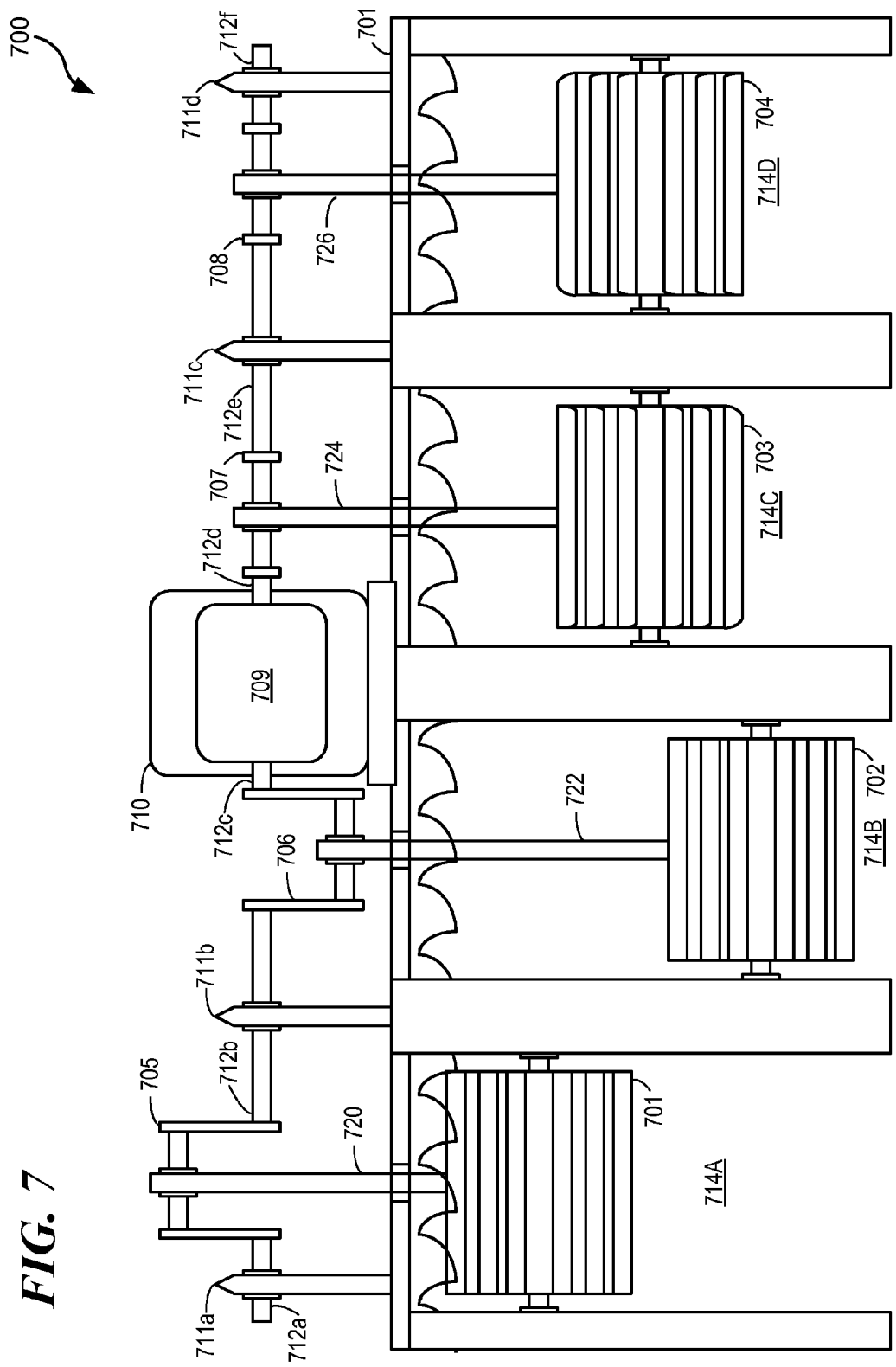
FIG. 7 is a high-level block diagram showing a fluid energy capture system, which can be implemented in accordance with a preferred embodiment.

Moreover, the embodiments disclosed in FIGS. 1-6 can also be combined to form a multiple blade system. For example, FIG. 7 illustrates a system 700 configured with four sets of blades, each set coupled to a common gear assembly. As described in more detail below, some embodiments include multiple blades coupled together into a set of blades. In one embodiment, as described in more detail below, a set of blades coupled together form a "blade box." In one embodiment, a set of blades, coupled together, and the associated rod arm and other components, together form a "blade box."

In the illustrated embodiment, system 700 includes four fluid capture channels and four associated blade-and-rod-arm assemblies. For ease of explanation, in the illustrated embodiment, a blade-and-rod-arm assembly will be referred to as a "blade box." Specifically, blade box 701 is associated with fluid capture channel 714A. Similarly, blade box 702 is associated with fluid capture channel 714B. Similarly, blade box 703 is associated with fluid capture channel 714C. Similarly, blade box 704 is associated with fluid capture channel 714D.

Generally, in operation, the blades of each blade box remain immersed within the fluid flow. Generally, the blade boxes interact with the fluid flow to capture fluid energy so as to apply torque to gear assembly 209. In the illustrated embodiment, gear assembly 209 applies torque to generator 210, which converts torque to electrical energy.

In the illustrated embodiment, system 700 includes sidewalls 230, which separate and define the fluid capture channels. Additionally, in the illustrated embodiment, sidewalls 230 also include portions of a horizontal limiting system, such as slot 105 of FIG. 1, For example. Similarly, in the illustrated embodiment, each blade box also includes portions of a horizontal limiting system, such as shaft 104 of FIG. 1, for example.

In the illustrated embodiment, each blade box includes six individual blades. Generally, a blade box configured with a multiple blade design increases the amount of blade surface that interacts with the fluid flow, which results in increased torque captured by the system. In one embodiment, each blade box includes four individual blades. One skilled in the art will understand that the number of blades in each blade box can vary. As such, the number and size of each blade can be configured to optimize energy capture in the expected operational environment.

In the illustrated embodiment, each blade box couples to a crankshaft, which couples to a gear assembly. More particularly, the system 700 crankshaft includes shafts 712a, 712b, 712d, 712e, and 712f. System 700 also includes bearing assemblies 711a, 711b, 711c, 711d, 711e, and 711f. Cranks 705, 706, 707, and 708, couple the shafts together and to the gear assembly, forming a power train. Each crank also couples to an associated blade box. In the illustrated embodiment, the point at which a crank couples to its associated blade box corresponds to point 120 of FIGS. 1-6.

In the illustrated embodiment, each crank couples to its neighboring shafts in a configuration that places each point 120 at a different point in the operational cycle. For example, crank 705 and crank 706 operate so that the crank 705 point 120 and the crank 706 point 120 remain approximately 180 degrees opposite to each other as the cranks move through the operational cycle. Similarly, crank 707 and crank 708 operate so that the crank 707 point 120 and the crank 708 point 120 remain approximately 180 degrees opposite to each other as the cranks move through the operational cycle. Additionally, in the illustrated embodiment, cranks 706 and 707 operate so that the crank 706 point 120 and the crank 707 point 120 remain approximately 90 degrees apart from each other as the cranks move through the operational cycle.

In the illustrated embodiment, system 700 is shown in operation. Specifically, crank 705 is shown at the "top" (i.e., the 0 degree position) of its "stroke" (i.e., operational cycle), while crank 706 is shown at the "bottom" (i.e., the 180 degree position) of its stroke. Similarly, crank 707 is shown oriented toward the viewer (at the 90 degree or 270 degree position) and crank 708 is shown oriented away from the viewer (at the 270 degree or 90 degree position). So configured, the blade boxes 701, 702, 703, 704 are oriented 90 degrees apart in relation to each other, around the rotational orbit of the crankshaft as a whole, while at the same time, being balanced pairs on either side of gear box 709 and generator 710.

The illustrated embodiment provides a particularly effective configuration for extracting energy from a fluid flow. More particularly, system 700 includes four blade boxes and cranks. In the illustrated embodiment, when one set of cranks (cranks 705 and 706) are at the top and bottom of their respective operational cycle, and therefore at a transition point of minimal torque, the other set of cranks (cranks 707 and 708) are at their maximum torque positions (one at a maximum upward torque position and the other at a maximum downward torque position). So configured, the resultant overall torque applied to gear assembly 709 is relatively smooth, constant, and almost flat. For example, FIG. 8 illustrates torque output in one embodiment.

Figure 8:
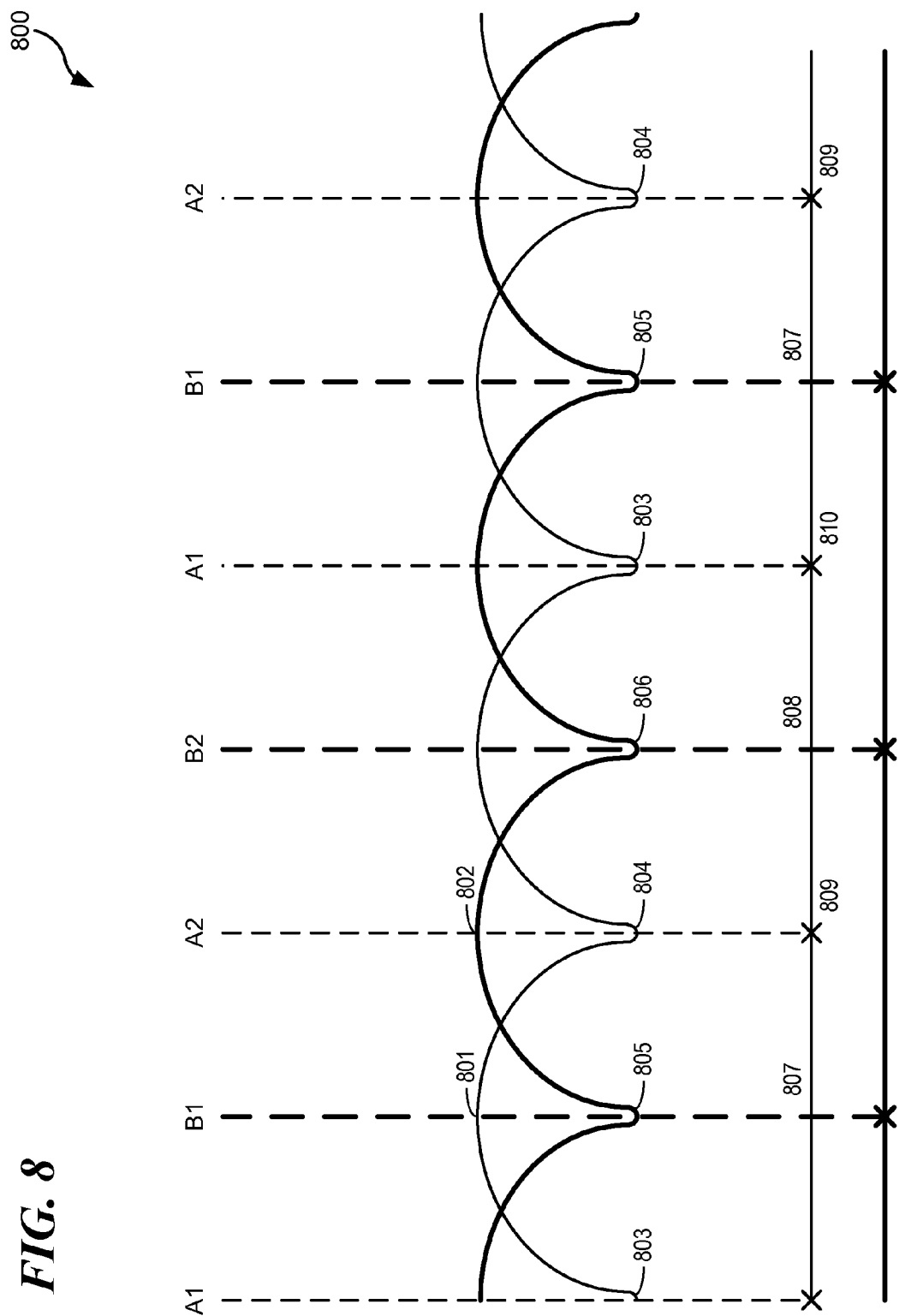
FIG. 8 is a graph illustrating torque output of an exemplary fluid energy capture system, which can be implemented in accordance with a preferred embodiment.

Specifically, FIG. 8 shows a graph 800 illustrating generalized data relating to a blade box and its orientation as the blade box moves through an operational cycle. The data represented by the illustrated curves have been abstracted to illustrate the principles underlying the embodiments disclosed herein and are not based on specific measured data. In the illustrated embodiment, curve 801 represents the torque output of blade boxes 701 and 702 of FIG. 7 as the blade boxes move through a series of operational cycles. Similarly, curve 802 represents the torque output of blade boxes 703 and 704 of FIG. 7 as the blade boxes move through a series of operational cycles.

As described above, in one embodiment, blade boxes 701 and 702 are configured so that their respective points 120 are approximately 180 degrees apart over the course of an operational cycle. One skilled in the art will appreciate that blade boxes 701 and 702 move through their operational cycles synchronously, such that both blade boxes (in the pair) are at transition points and maximal torque points substantially simultaneously. Similarly, in one embodiment, blade boxes 703 and 704 are also configured so that their respective points 120 are approximately 180 degrees apart over the course of an operational cycle. One skilled in the art will appreciate that blade boxes 703 and 704 also move through their operational cycles synchronously, such that both blade boxes (in the pair) are at transition points and minimal torque points substantially simultaneously.

As described above, in one embodiment, blade boxes 701 and 702 are oriented so that their respective points 120 are approximately 90 degrees apart from the points 120 of blade boxes 703 and 704. The intersection of line A1 and curve 801 indicates the point in the operational cycle where both blade boxes 701 and 702 are at transition points (i.e., minimal torque output). One skilled in the art will appreciate that the minimal torque output indicated at curve 801 (line A1) substantially aligns with a maximal torque output indicated at curve 802.

One skilled in the art will also appreciate that in an embodiment with blade boxes aligned 180 degrees apart, the maximal torque output occurs in two orientations in each operational cycle. For example, in the illustrated embodiment, line A1 intersects curve 801 at point 803, where the torque output is a local minimum. More specifically, at point 803, both blade boxes 701 and 702 are at transition points, with blade box 701 in the 0 degree orientation and blade box 702 in the 180 degree orientation. Similarly, in the illustrated embodiment, line A2 intersects curve 801 at point 804, where the torque output is a local minimum. More specifically, at point 803, both blade boxes 701 and 702 are at transition points, with blade box 701 in the 180 degree orientation and blade box 702 in the 0 degree orientation. One skilled in the art will appreciate that points 803 and 805 indicate local minimal torque output from the pair of blade boxes 701 and 702. In one embodiment, each occurrence of point 803 indicates that a complete operational cycle (one revolution of a point 120 around crank 101) has been completed, and another operational cycle is beginning.

Similarly, in the illustrated embodiment, line B1 intersects curve 802 at point 805, where the torque output (of the blade box pair made up of blade boxes 703 and 704) is a local minimum. More specifically, at point 803, both blade boxes 703 and 704 are at transition points, with blade box 703 in the 0 degree orientation and blade box 704 in the 180 degree orientation. Similarly, in the illustrated embodiment, line B2 intersects curve 802 at point 806, where the torque output is a local minimum. More specifically, at point 806, both blade boxes 703 and 704 are at transition points, with blade box 703 in the 180 degree orientation and blade box 704 in the 0 degree orientation. One skilled in the art will appreciate that points 805 and 806 indicate local minimal torque output from the pair of blade boxes 703 and 704. In one embodiment, each occurrence of point 805 indicates that a complete operational cycle (one revolution of a point 120 around crank 101) has been completed, and another operational cycle is beginning.

One skilled in the art will appreciate that the 90 degree operational cycle offset between the first pair of blade boxes (701 and 702) and the second pair of blade boxes (703 and 704) align the resultant torque output so that one pair's minimal torque output occurs substantially simultaneously with the other pair's maximal torque output. Similarly, lines 807, 808, 809, and 810 indicate that the transition points of the pairs of blade boxes occur 90 degrees apart in the operational cycle. So configured, the pairs of blade boxes together capture energy from a fluid flow to produce a steadier torque output than would blade boxes configured with unaligned operational cycles.

In the embodiment illustrated in FIG. 7, the blade boxes are also shown aligned in parallel, perpendicular to the fluid flow. In an alternate embodiment, the blade boxes can be configured offset, aligned, in series (i.e., blade boxes positioned "downstream" from a first blade box), or a combination of series and parallel configurations. For example, FIG. 9 illustrates a configuration with blade boxes grouped into pairs, with paired blade boxes in parallel to each other and the pairs together in series with each other.

Figure 9:
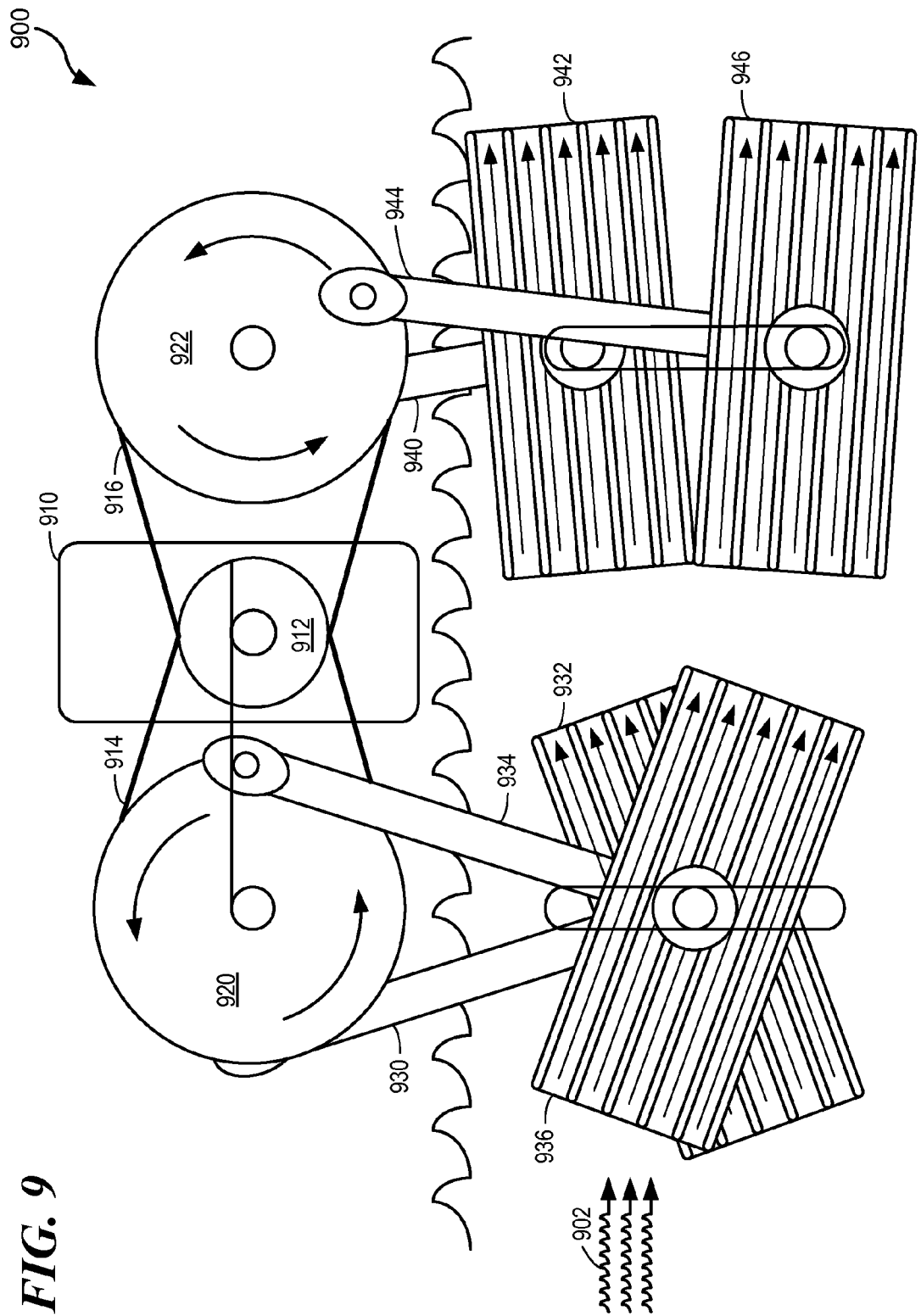
FIG. 9 is a high-level block diagram showing a fluid energy capture system, which can be implemented in accordance with a preferred embodiment.

More specifically, FIG. 9 illustrates a system 900 for capturing energy from a fluid flow. In the illustrated embodiment, system 900 includes a generator 910 coupled to receive torque from a main drive pulley 912. Cranks 920 and 922 couple to deliver torque to main drive pulley 912 through drive belts 914 and 916, respectively. In the illustrated embodiment, drive belts 914 and 916 are industrial-sized notch belts. Generally, an industrial-sized notch belt is a notch belt of sufficient size to operate in an industrial energy production environment. In an alternate embodiment, drive belts 914 and 916 can be replaced by chains, gears, sprockets, and/or other suitable transmission mechanisms. One skilled in the art will appreciate that other suitable torque transmissions mechanisms can also be employed.

In the illustrated embodiment, four blade boxes each couple to an associated rod arm and each rod arm couples to a crank. For example, blade box 932 couples to rod arm 930, which couples to crank 920. Similarly, blade box 936 couples to rod arm 934, which couples to crank 920. Similarly, blade box 942 couples to rod arm 940, which couples to crank 922. Similarly, blade box 946 couples to rod arm 944, which couples to crank 922.

Additionally, in the illustrated embodiment, each rod arm is one of a pair of rod arms that couple to the same crank. As shown, each rod arm couple to a crank a position 180 degrees out of phase with the other rod arm in the pair. Additionally, in the illustrated embodiment, the pairs of rod arms are also 180 degrees out of phase with each other. That is, in the illustrated embodiment, rod arms 930 and 934 couple to crank 920 so that the attachment points are 180 degrees out of phase with the attachment point at which rod arms 940 and 944 couple to crank 920. As described above, this configuration produces an advantageous output torque curve. More particularly, this configuration aligns the transition points of each blade box's stroke approximately 90 degrees apart.

In the illustrated embodiment, and in the embodiment represented by system 700 of FIG. 7, system 900 includes four sets of blades arranged as four blade boxes, each blade box having six blades. One skilled in the art will appreciate that other arrangements can also be employed. For example, in one embodiment, the number of blades in each blade box, and the number of blade boxes, can each vary independently from the configuration of the other blade boxes. However, as shown in FIG. 8, a system configured with four blade boxes or sets of blades provides advantages over certain other configurations.

One skilled in the art will also appreciate that certain configuration changes can modify the torque output performance of the system. For example, in a system with six blade boxes, each blade box rod arm can be configured 120 degrees apart from the other (two) blade box rod arms coupled to that crank, with the blade box rod arms coupled to the first crank each offset by 60 degrees from the blade box rod arms coupled to the second crank. In one embodiment, a six-blade-box configuration can generate a flatter torque output than a four-blade-box configuration.

Similarly, in a system with eight blade boxes, each blade box rod arm can be configured 90 degrees apart from the other (three) blade box rod arms coupled to that crank, with the blade box rod arms coupled to the first crank each offset by 45 degrees from the blade box rod arms coupled to the second crank. In one embodiment, an eight-blade-box configuration can generate a flatter torque output than a four-blade-box configuration. Additionally, one skilled in the art will appreciate that increasing the number of blade boxes employed in the system can also increase the total power output generated by the system.

In the illustrated embodiment, blade boxes 942 and 945 are positioned "downwind" or "downcurrent" from blade boxes 932 and 936. Generally, in one embodiment, "downwind" and "downcurrent" refer to a location behind an object of comparison, relative to the fluid flow. In the illustrated embodiment, blade boxes 942 and 946 are shown as having substantially the same dimensions as blade boxes 932 and 935. In an alternate embodiment, described in more detail below, the various blade boxes can be configured with varying dimensions.

Figure 10:
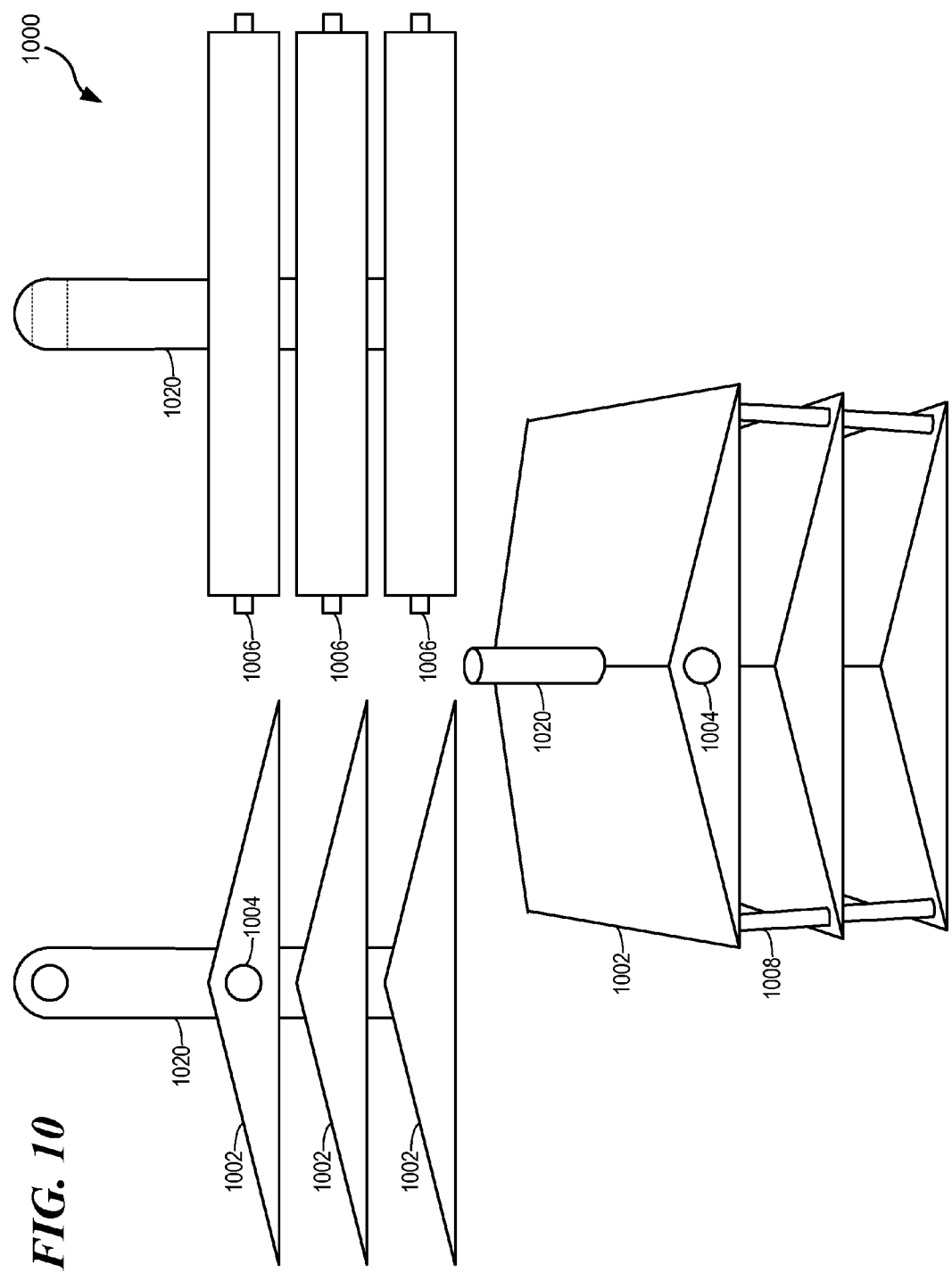
FIG. 10 is a high-level block diagram illustrating an exemplary multi-blade configuration, which can be implemented in accordance with a preferred embodiment.

For example, FIG. 10 shows a blade box 1000 in a variety of configurations. In each configuration, blade box 1000 includes a rod arm 1020 coupled to one or more blades 1002. In the illustrated embodiments, each configuration includes three blades 1002. One skilled in the art will appreciate that the configurations shown in FIG. 10 can be adapted for use in blade boxes having more or less than three blades 1002.

In one configuration, blade box 1000 includes a single limiter shaft 1004. Generally, limiter shaft 1004 is configured to interface with a slot of a horizontal limiter system as described above in one embodiment. In the illustrated configuration, blade box 1000 includes a single limiter shaft 1004, coupled to the blade 1002 closest to the end of rod arm 1020 that couples to a gear assembly or crank.

In alternate embodiments, limiter shaft 1004 can be coupled to one or more of the other blades. For example, another configuration of blade box 1000 includes a plurality of limiter shafts 1006. Generally, each limiter shaft 1006 is configured to interface with a slot of a horizontal limiter system as described above in one embodiment.

In another illustrated configuration, blade box 1000 also includes stabilizing framework 1008. Generally, stabilizing framework 1008 couples to each blade 1002 of blade box 1000. Generally, stabilizing framework 1008 is configured to maintain the orientation of each blade 1002 relative to the other blades 1002 in blade box 1000. In one embodiment, stabilizing framework 1008 also provides additional stability and support to one or more blades 1002.

In the illustrated embodiment, stabilizing framework 1008 is shown embodied as a plurality of rods or columns, coupled between neighboring blades 1002. In an alternate embodiment, stabilizing framework 1008 can be configured to couple one or more blades 1002 to rod arm 1020 and/or to each other blade 1002. One skilled in the art will understand that other configurations can also be employed.

In one embodiment, blade 1002 is constructed from any appropriate materials and with any appropriate construction designs that give it sufficient strength and flexibility to withstand the forces expected to be exerted on it. For example, in one embodiment, blade 1002 is made of aluminum, using common aircraft construction methods, which makes the wing relatively light and strong, and therefore proves to be a very satisfactory method of construction. Generally, blade 1002 is configured to be disposed within a fluid flow. In one embodiment, blade 1002 is designed to bend, bow, or otherwise deflect at fluid flow speeds higher than a predetermined maximum, so as to protect blade 1002 from damage caused by high winds.

In one embodiment, blades 1002 can be constructed in varying dimensions, even within the same system. For example, in the embodiment illustrated in FIG. 7, the blade boxes are configured substantially in parallel within the fluid flow. In the embodiment illustrated in FIG. 9, the blade boxes are configured substantially in series within the fluid flow. One skilled in the art will appreciate that the arrangement of the blade boxes relative to each other within the fluid flow can also be varied. Additionally, the dimensions of the blades and/or blade boxes can be configured to provide additional benefits depending on the arrangement of the blade boxes relative to each other within the fluid flow.

Figure 11:
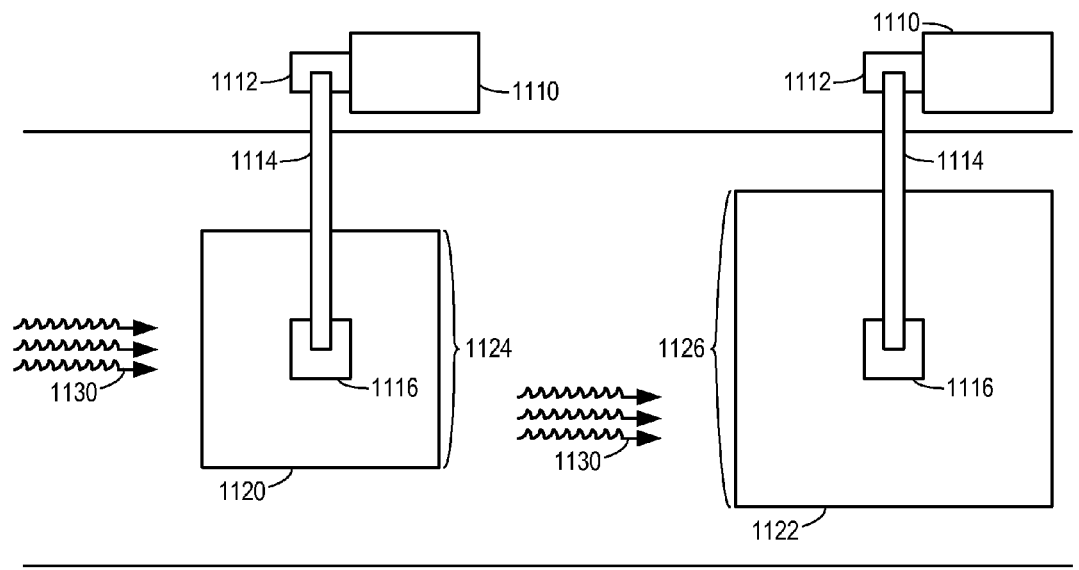
FIG. 11 is a high-level block diagram illustrating an exemplary multi-sized blade configuration, which can be implemented in accordance with a preferred embodiment.
Figure 11:
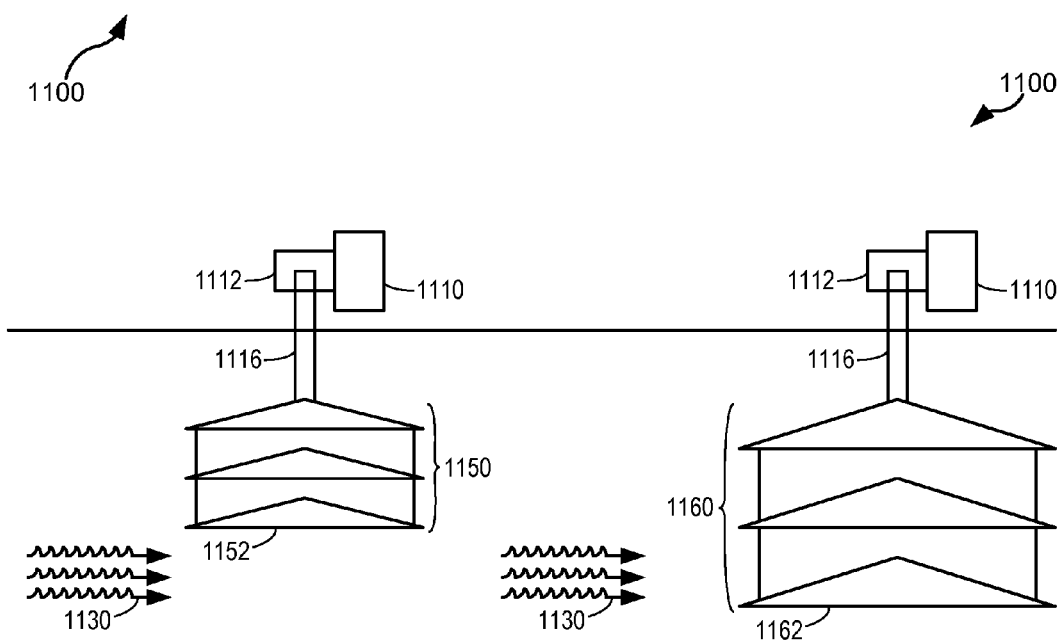

For example, FIG. 11 illustrates a top and side view of a multi-blade box system 1100, configured with differently sized blades. Generally, in the illustrated embodiment, blade boxes 1120 and 1122 interact with flow 1130 to deliver torque to a generator 1110. In the illustrated embodiment, each blade box delivers torque to an independent generator 1110. In an alternate embodiment, both blade boxes 1120 and 1122 deliver torque to the same generator 1110.

In the illustrated embodiment, each generator 1110 couples to an associated main shaft 1112. Generally, drive shaft 1112 is configured to deliver received torque to generator 1110. In the illustrated embodiment, each drive shaft 1112 couples to a crank shaft 1114. Generally, each crank shaft 1114 is configured to receive torque from a blade box and to deliver received torque to a drive shaft 1112.

In the illustrated embodiment, each crank shaft 1114 couples to a blade box rod 1116. As described above, in one embodiment, each blade box includes a horizontal limiting system. In the illustrated embodiment, the horizontal limiting systems have been omitted for clarity of explanation.

In the illustrated embodiment, blade box 1120 is positioned "upstream" or "upcurrent" from blade box 1122. That is, fluid in flow 1130 passes (along, through, and/or around) blade box 1120 before passing (along, through, and/or around) blade box 1122. As such, blade box 1120 is "upstream" from blade box 1122, and blade box 1122 is "downstream" from blade box 1120.

In the illustrated embodiment, box 1120 and box 1122 are each configured with different dimensions. Generally, in one embodiment, downstream blade boxes are larger and present more surface area to the fluid flow than upstream blade boxes. One skilled in the art will appreciate that the fluid flow on the downstream side of blade box 1120 (i.e., the upstream side of blade box 1122) is typically slower than the fluid flow on the upstream side of blade box 1120. As such, in the illustrated embodiment, blade box 1122 is configured with certain larger dimensions than blade box 1120.

For example, in the illustrated embodiment, the width 1126 of blade box 1122 is larger than the width 1124 of blade box 1120. Similarly, the height 1160 of blade box 1122 is larger than the height 1150 of blade box 1120. Similarly, the length 1162 of blade box 1122 is larger than the length 1152 of blade box 1120. One skilled in the art will appreciate that some or all of these size characteristics can be modified based on the expected operational environment and/or any other suitable objective. Moreover, one skilled in the art will also appreciate that in the design of blade box 1120 and 1122 these size characteristics can be manipulated in addition to or instead of other characteristics.

Figure 12:
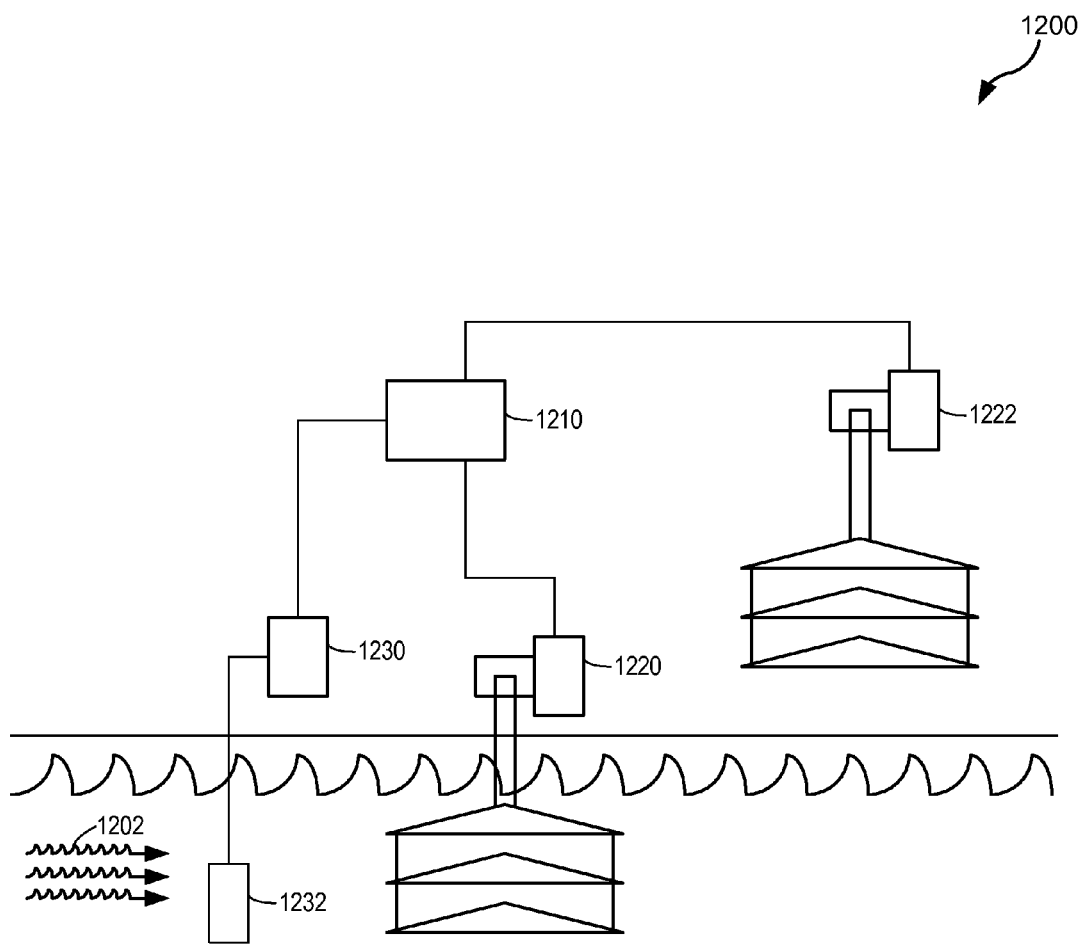
FIG. 12 is a high-level block diagram illustrating an exemplary fluid energy capture system with regulatory control systems.

Some embodiments can also be configured to respond to changes in the operating environment. For example, FIG. 12 illustrates an exemplary fluid energy capture system with control elements. In the illustrated embodiment, system 1200 includes additional standard components configured to control system 1200 and to regulate the interaction of various components of system 1200 with fluid flow 1202. For example, in the illustrated embodiment, system 1200 includes a command and control (CNC) module 1210. Generally, CNC module 1210 is configured to monitor the operational characteristics of one or more of the components of system 1200 and to issue instructions based on monitored characteristics.

In the illustrated embodiment, CNC module 1210 couples to a probe interface 1230. Generally, probe interface 1230 is shown as an abstraction of a sensor control system and couples to a probe 1232. In the illustrated embodiment, interface 1230 is configured to receive and process environmental data measured or otherwise captured form probe 1232. In the illustrated embodiment, probe 1232 is an abstracted representation of a sensor, and is shown disposed within fluid flow 1202. One skilled in the art will appreciate that probe 1232 can be configured to measure or otherwise capture whatever suitable data CNC module 1210 uses to monitor and control system 1200.

For example, in the illustrated embodiment, CNC module 1210 couples to two subsystems, shown as subsystems 1220 and 1222. Generally, subsystems 1220 and 1222 are abstracted representations of one or more of the embodiments disclosed herein. For example, in the illustrated embodiment, subsystems 1220 and 1222 each include a blade box, rod arm, crank, and generator. One skilled in the art will appreciate that subsystems 1220 and 1222 can be configured so that only a portion of their components interface with flow 1202.

Broadly, in one embodiment, CNC module 1210 is configured to move (or cause to be moved) each subsystem 1220 and 1222 into and out of fluid flow 1202. As described in more detail below, CNC module 1210 can be configured to move subsystems 1220 and 1222 into and out of fluid flow 1202 based on changing operational conditions, such as the torque output from the subsystems, the flow rate (or other characteristics) of flow 1202, and/or any other suitable condition. As described above, in one embodiment, system 1200 monitors environment conditions through a probe 1232.

Generally, in one embodiment, system 1200 is configured such that each subsystem 1220 and 1222 are either fully engaged with fluid flow 1202 or fully disengaged from fluid flow 1202. In one embodiment, a subsystem is fully engaged with a fluid flow when every blade of the subsystem is fully immersed within the fluid flow. Similarly, in one embodiment, a subsystem is fully disengaged from a fluid flow when no blade of the subsystem is fully immersed within the fluid flow. In one embodiment, one or more of subsystems 1220 and 1222 can be partially immersed within the fluid flow. In one embodiment, a subsystem is partially immersed within the fluid flow when at least one, but not all, of the subsystem blades are at least partially immersed within the fluid flow.

Figure 13:
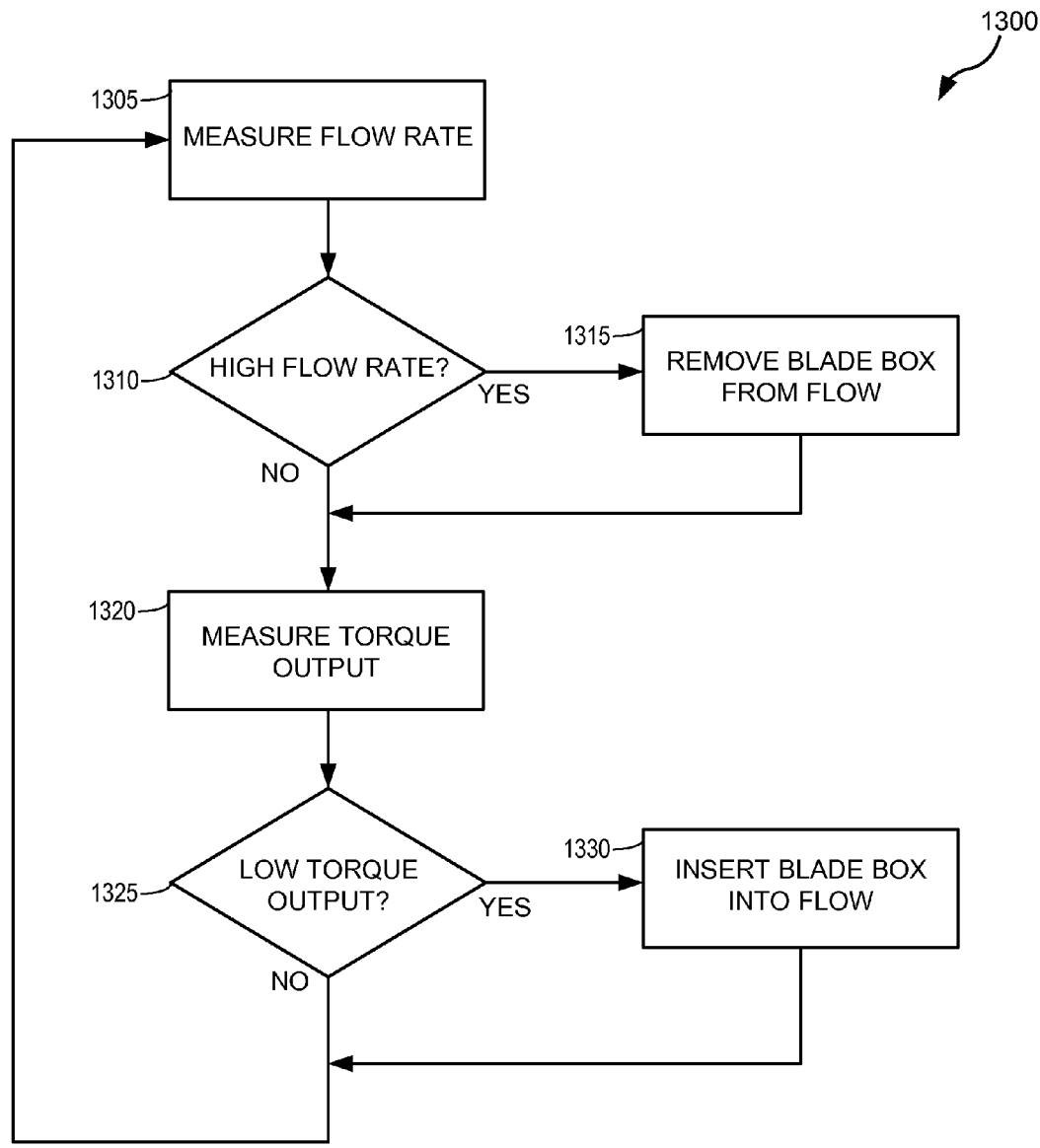
FIG. 13 is a flow diagram illustrating an exemplary fluid energy capture method, which can be implemented in accordance with a preferred embodiment.

FIG. 13 illustrates a flow diagram 1300 describing a fluid energy capture method in accordance with one embodiment. The process begins at block 1305, wherein a fluid energy capture system measures the flow rate of a fluid flow. For example, in one embodiment, probe 1232 measures the flow rates of flow 1202 of FIG. 12. Next, as indicated at block 1310, the method determines whether the measured flow rate is above a predetermined high flow rate. For example, in one embodiment, the predetermined high flow rate is based on the safe operating condition of all of the blade boxes currently disposed within the measured fluid flow. In one embodiment, the predetermined high flow rate is based on historical environmental conditions in the target operating environment.

If at block 1310 it is determined that the flow rate is at or above the predetermined high flow rate, the process continues along the YES branch to block 1315. As indicated at block 1315, the method removes one of the currently operational blade boxes from the fluid flow. For example, in one embodiment, CNC module 1210 removes subsystem 1222 from interaction with flow 1202 of FIG. 12. In an alternate embodiment, CNC module 1210 adjusts subsystem 1222 so that subsystem 1222 moves from fully immersed in flow 1202 to being partially immersed within flow 1202. Next, the process continues to block 1320.

If at block 1310 it is determined that the flow rate is not at or above the predetermined high flow rate, the process continues along the NO branch to block 1320. As indicated at block 1320, the fluid energy capture system measures the torque output generated by the fluid energy capture system. For example, in one embodiment, CNC module 1210 measures the torque output of (or electrical power generated by) subsystem 1220 of FIG. 12. One skilled in the art will appreciate that torque output can be measured directly or indirectly, such as by measuring the electrical output of a generator receiving the torque output as an input, for example.

Next, as indicated at block 1325, the method determines whether the measured torque output is at or below a predetermined low output. For example, in one embodiment, the predetermined low output is based on the minimal efficient operational output of the fluid energy capture system. In one embodiment, the predetermined low output is based on a minimal required demand output.

If at block 1325 it is determined that the torque output is at or below the predetermined low output, the process continues along the YES branch to block 1330. As indicated at block 1330, the method inserts one of the currently non-operational blade boxes into the fluid flow. For example, in one embodiment, CNC module 1210 inserts subsystem 1222 into flow 1202 of FIG. 12. In an alternate embodiment, CNC module 1210 adjusts subsystem 1222 so that subsystem 1222 moves from partially immersed in flow 1202 to being fully immersed within flow 1202. Next, the process returns to block 1305.

If at block 1310 it is determined that the flow rate is not at or above the predetermined high flow rate, the process continues along the NO branch to block 1305. Thus, the disclosed embodiments can be configured to respond to local operating conditions to help maintain a consistent, safe, and/or minimal energy output, even as local operating conditions change over time. So configured, the disclosed embodiments provide a more stable response and performance than typical systems and methods.

As such, as described above, the embodiments disclosed herein can be configured to respond dynamically to changing operational environmental conditions, while maintaining broad safety and efficiency targets. Moreover, in both stable and varying environmental conditions, the embodiments disclosed herein can be configured to provide fluid energy capture systems and methods superior to common systems and methods.

Generally, typical water current fluid energy extraction systems cannot be configured to extract sufficient energy to drive commercial-size systems that can provide power plants for cities and towns. But the embodiments disclosed herein can be configured to extract sufficient energy from water fluid flows to drive commercial-size systems that can provide power plants for cities and towns. Additionally, the disclosed embodiments can be coupled with low rpm generator technology.

Moreover, the embodiments disclosed herein can be configured to generate renewable energy with a reduced impact on the operating ecosystem, as it is not necessary to dam, divert or otherwise negatively impact the natural flow of the target fluid. Additionally, the embodiments disclosed herein can be configured to reduce the threat to fish or other wildlife found in the natural system in which it is used. Moreover, the embodiments disclosed herein can be configured to operate with minimal ecosystem impact, while also generating cost-efficient power.

Additionally, the embodiments described herein can be configured to extract relatively very large amounts of power from the volume of a moving fluid instead of relying on a high state of velocity being present in the mass of the fluid. For example, the embodiments described herein can be configured to operate in river systems that offer currents flowing from three (3) to fifteen (15) miles an hour. Even in such low speed currents, the disclosed embodiments can be configured to provide cost-effective power production without any need to alter (or otherwise increase) the fluid flow, such as by means of a dam or other system.

One skilled in the art will appreciate the embodiments disclosed above, and other features and functions, or alternatives thereof, may be desirably combined into many other different systems or applications. Additionally, various presently unforeseen or unanticipated alternatives, modifications, variations or improvements therein may be subsequently made by those skilled in the art, which are also intended to be encompassed by the following claims.

What is claimed is:

1. A system for capturing fluid energy, comprising:
a gear assembly having a gear assembly axis, the gear assembly being able to couple to a drive shaft so as to impart rotational energy to the drive shaft;
a first blade shaft coupled to the gear assembly;
a first blade assembly coupled to the first blade shaft, the first blade assembly comprising:
a first rod arm able to couple to the first blade shaft;
a first blade having a first front surface and a first blade plane, the first blade being fixedly coupled to the first rod arm such that the first rod arm is normal to the first blade plane;

a first limiter coupling having a first limiter coupling axis, the first limiter coupling being coupled to the first blade such that the first limiter coupling axis is parallel to the first front surface and the first limiter coupling axis is perpendicular to the first rod arm; and a first horizontal limiter coupled to the first limiter coupling such that the first limiter coupling is restricted to a range of motion substantially along a first movement axis;

the first movement axis being perpendicular to the first limiter coupling axis, and the first movement axis being perpendicular to the first blade shaft;

the first blade assembly being able to interact with a fluid flow and to transmit fluid energy from the fluid flow to the first blade shaft so as to impart rotational energy to the gear assembly by rotating the gear assembly about the gear assembly axis; and a command and control (CNC) module coupled to the first blade assembly, the CNC module configured to move the first blade assembly into and out of the fluid flow based on the rate of fluid flow.

2. The system of claim 1, wherein the gear assembly is a single crank wheel.

3. The system of claim 1, wherein the first blade assembly further comprises:
a second blade having a second front surface and a second blade plane, the second blade being fixedly coupled to the first blade such that the rod arm is substantially normal to the second blade plane and the second blade plane is substantially parallel to the first blade plane.

4. The system of claim 1, wherein the first blade assembly further comprises:
a second blade having a second front surface and a second blade plane, the second blade being fixedly coupled to the first blade such that the rod arm is substantially normal to the second blade plane and the second blade plane is substantially parallel to the first blade plane; and
a second limiter coupling having a second limiter coupling axis, the second limiter coupling being coupled to the second blade such that the second limiter coupling axis is substantially parallel to the second front surface and the second limiter coupling axis is substantially perpendicular to the rod arm;
wherein the second limiter coupling couples to the horizontal limiter.

5. The system of claim 1, further comprising:
a second blade assembly coupled to the first blade shaft, the second blade assembly comprising:
a second rod arm able to couple to the first blade shaft;
a second blade having a second front surface and a second blade plane, the second blade being fixedly coupled to the second rod arm such that the second rod arm is substantially normal to the second blade plane;
a second limiter coupling having a second limiter coupling axis, the second limiter coupling being coupled to the second blade such that the second limiter coupling axis is substantially parallel to the second front surface and the second limiter coupling axis is substantially perpendicular to the second rod arm; and
a second horizontal limiter coupled to the second limiter coupling such that the second limiter coupling is restricted to a range of motion substantially along a second movement axis;

the second movement axis being substantially perpendicular to the second limiter coupling axis, and the second movement axis being substantially perpendicular to the first blade shaft;

the second blade assembly being able to interact with the fluid flow and to transmit fluid energy from the fluid flow to the first blade shaft so as to impart rotational energy to the gear assembly by rotating the gear assembly about the gear assembly axis; and wherein the second movement axis is substantially parallel to the first movement axis.

6. The system of claim 5, wherein the first blade assembly and the second blade assembly operate in synchronous motion.

7. The system of claim 5, wherein the first blade assembly and the second blade assembly operate in asynchronous motion configured to maximize rotational energy imparted to the gear assembly.

8. The system of claim 1, further comprising:
a second blade shaft coupled to the gear assembly;
a second blade assembly coupled to the second blade shaft, the second blade assembly comprising:
a second rod arm able to couple to the second blade shaft;
a second blade having a second front surface and a second blade plane, the second blade being fixedly coupled to the second rod arm such that the second rod arm is substantially normal to the second blade plane;
a second limiter coupling having a second limiter coupling axis, the second limiter coupling being coupled to the second blade such that the second limiter coupling axis is substantially parallel to the second front surface and the second limiter coupling axis is substantially perpendicular to the second rod arm; and
a second horizontal limiter coupled to the second limiter coupling such that the second limiter coupling is restricted to a range of motion substantially along a second movement axis;
the second movement axis being substantially perpendicular to the second limiter coupling axis, and the second movement axis being substantially perpendicular to the second blade shaft;
the second blade assembly being able to interact with the fluid flow and to transmit fluid energy from the fluid flow to the second blade shaft so as to impart rotational energy to the gear assembly by rotating the gear assembly about the gear assembly axis.

9. The system of claim 8, wherein:
the gear assembly further comprises a first crank wheel, a second crank wheel, and a main drive gear;
the first crank wheel couples to the first blade shaft and the main drive gear; and
the second crank wheel couples to the second blade shaft and the main drive gear.

10. A method for capturing fluid energy, comprising:
disposing a dolphin mill within a liquid flow, the liquid flow having a flow direction;
wherein the dolphin mill comprises:
a drive shaft;
a gear assembly having a gear assembly axis, the gear assembly being able to couple to the drive shaft so as to impart rotational energy to the drive shaft;
a first blade shaft coupled to the gear assembly;
a first blade assembly coupled to the first blade shaft, the first blade assembly comprising:

a first rod arm able to couple to the first blade shaft;
a first blade having a first front surface and a first blade plane, the first blade being fixedly coupled to the first rod arm such that the first rod arm is normal to the first blade plane;
a first limiter coupling having a first limiter coupling axis, the first limiter coupling being coupled to the first blade such that the first limiter coupling axis is parallel to the first front surface and the first limiter coupling axis is perpendicular to the first rod arm; and
a first horizontal limiter coupled to the first limiter coupling such that the first limiter coupling is restricted to a range of motion substantially along a first movement axis;
the first movement axis being perpendicular to the first limiter coupling axis, and the first movement axis being perpendicular to the first blade shaft; and
the first blade assembly being able to interact with the liquid flow and to transmit fluid energy from the liquid flow to the first blade shaft so as to impart rotational energy to the gear assembly by rotating the gear assembly about the gear assembly axis;
capturing the rotational energy of the drive shaft;
monitoring a flow rate of the liquid flow; and
moving the first blade assembly into and out of the liquid flow based on the flow rate of the liquid flow.

11. The method of claim 10, wherein the first blade assembly further comprises:
a second blade having a second front surface and a second blade plane, the second blade being fixedly coupled to the first blade such that the rod arm is substantially normal to the second blade plane and the second blade plane is substantially parallel to the first blade plane.

12. The method of claim 10, wherein the dolphin mill comprises:
a second blade assembly coupled to the first blade shaft, the second blade assembly comprising:
a second rod arm able to couple to the first blade shaft;
a second blade having a second front surface and a second blade plane, the second blade being fixedly coupled to the second rod arm such that the second rod arm is substantially normal to the second blade plane;
a second limiter coupling having a second limiter coupling axis, the second limiter coupling being coupled to the second blade such that the second limiter coupling axis is substantially parallel to the second front surface and the second limiter coupling axis is substantially perpendicular to the second rod arm; and
a second horizontal limiter coupled to the second limiter coupling such that the second limiter coupling is restricted to a range of motion substantially along a second movement axis;
the second movement axis being substantially perpendicular to the second limiter coupling axis, and the second movement axis being substantially perpendicular to the first blade shaft;
the second blade assembly being able to interact with the liquid flow and to transmit fluid energy from the liquid flow to the second blade shaft so as to impart rotational energy to the gear assembly by rotating the gear assembly about the gear assembly axis; and
wherein the second movement axis is substantially parallel to the first movement axis.

13. The method of claim 12, wherein the first blade assembly and the second blade assembly operate in asynchronous motion configured to maximize rotational energy imparted to the gear assembly.

14. The method of claim 10, wherein the dolphin mill further comprises:
a second blade shaft coupled to the gear assembly;
a second blade assembly coupled to the second blade shaft, the second blade assembly comprising:
a second rod arm able to couple to the second blade shaft;
a second blade having a second front surface and a second blade plane, the second blade being fixedly coupled to the second rod arm such that the second rod arm is substantially normal to the second blade plane;
a second limiter coupling having a second limiter coupling axis, the second limiter coupling being coupled to the second blade such that the second limiter coupling axis is substantially parallel to the second front surface and the second limiter coupling axis is substantially perpendicular to the second rod arm; and
a second horizontal limiter coupled to the second limiter coupling such that the second limiter coupling is restricted to a range of motion substantially along a second movement axis;
the second movement axis being substantially perpendicular to the second limiter coupling axis, and the second movement axis being substantially perpendicular to the second blade shaft;
the second blade assembly being able to interact with the fluid flow and to transmit fluid energy from the fluid flow to the second blade shaft so as to impart rotational energy to the gear assembly by rotating the gear assembly about the gear assembly axis.

15. A system for generating electrical energy, comprising:
a drive shaft configured to rotate about a main axis in response to applied torque, thereby generating rotational energy;
a dolphin mill coupled to the drive shaft, the dolphin mill configured to apply torque to the drive shaft;
the dolphin mill comprising:
a coupling module configured to couple to the drive shaft;
a gear assembly having a gear assembly axis, the gear assembly being able to couple to the drive shaft so as to impart rotational energy from the coupling module to the drive shaft;
a first blade shaft coupled to the gear assembly;
a first blade assembly coupled to the first blade shaft, the first blade assembly comprising:
a first rod arm able to couple to the first blade shaft;
a first blade having a first front surface and a first blade plane, the first blade being fixedly coupled to the first rod arm such that the first rod arm is normal to the first blade plane;
a first limiter coupling having a first limiter coupling axis, the first limiter coupling being coupled to the first blade such that the first limiter coupling axis is parallel to the first front surface and the first limiter coupling axis is perpendicular to the first rod arm; and
a first horizontal limiter coupled to the first limiter coupling such that the first limiter coupling is restricted to a range of motion substantially along a first movement axis;
wherein the first horizontal limiter comprises a slot to receive the first limiter coupling;

the first movement axis being perpendicular to the first limiter coupling axis, and the first movement axis being perpendicular to the first blade shaft; and the first blade assembly being able to interact with a liquid flow and to transmit fluid energy from the liquid flow to the first blade shaft so as to impart rotational energy to the gear assembly by rotating the gear assembly about the gear assembly axis; and a generator coupled to the first drive shaft segment;

the generator configured to convert rotational energy of the drive shaft into electrical energy; and a command and control (CNC) module coupled to the first blade assembly, the CNC module configured to move the first blade assembly into and out of the liquid flow based on the rate of liquid flow.

16. The system of claim 15, wherein the first blade assembly further comprises:

a second blade having a second front surface and a second blade plane, the second blade being fixedly coupled to the first blade such that the rod arm is substantially normal to the second blade plane and the second blade plane is substantially parallel to the first blade plane.

17. The system of claim 15, wherein the dolphin mill comprises:

a second blade assembly coupled to the first blade shaft, the second blade assembly comprising:

a second rod arm able to couple to the first blade shaft;

a second blade having a second front surface and a second blade plane, the second blade being fixedly coupled to the second rod arm such that the second rod arm is substantially normal to the second blade plane;

a second limiter coupling having a second limiter coupling axis, the second limiter coupling being coupled to the second blade such that the second limiter coupling axis is substantially parallel to the second front surface and the second limiter coupling axis is substantially perpendicular to the second rod arm; and a second horizontal limiter coupled to the second limiter coupling such that the second limiter coupling is restricted to a range of motion substantially along a second movement axis;

the second movement axis being substantially perpendicular to the second limiter coupling axis, and the second movement axis being substantially perpendicular to the first blade shaft;

the second blade assembly being able to interact with the liquid flow and to transmit fluid energy from the liquid flow to the first blade shaft so as to impart rotational energy to the gear assembly by rotating the gear assembly about the gear assembly axis; and wherein the second movement axis is substantially parallel to the first movement axis.

18. The system of claim 17, wherein the first blade assembly and the second blade assembly operate in asynchronous motion configured to maximize rotational energy imparted to the gear assembly.

19. The system of claim 15, wherein the dolphin mill further comprises:

a second blade shaft coupled to the gear assembly;

a second blade assembly coupled to the second blade shaft, the second blade assembly comprising:

a second rod arm able to couple to the second blade shaft;

a second blade having a second front surface and a second blade plane, the second blade being fixedly coupled to the second rod arm such that the second rod arm is substantially normal to the second blade plane;

a second limiter coupling having a second limiter coupling axis, the second limiter coupling being coupled to the second blade such that the second limiter coupling axis is substantially parallel to the second front surface and the second limiter coupling axis is substantially perpendicular to the second rod arm; and a second horizontal limiter coupled to the second limiter coupling such that the second limiter coupling is restricted to a range of motion substantially along a second movement axis;

the second movement axis being substantially perpendicular to the second limiter coupling axis, and the second movement axis being substantially perpendicular to the second blade shaft;

the second blade assembly being able to interact with the fluid flow and to transmit fluid energy from the fluid flow to the second blade shaft so as to impart rotational energy to the gear assembly by rotating the gear assembly about the gear assembly axis.

* * * * *